US012272883B2

(12) United States Patent
Lee et al.

(10) Patent No.: US 12,272,883 B2
(45) Date of Patent: Apr. 8, 2025

(54) ELECTRONIC DEVICE PROVIDED WITH 5G ANTENNA

(71) Applicant: LG ELECTRONICS INC., Seoul (KR)

(72) Inventors: Songyi Lee, Seoul (KR); Moonsoo Song, Seoul (KR); Chisang You, Seoul (KR); Sungjoon Hong, Seoul (KR); Youngtaek Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 378 days.

(21) Appl. No.: 17/755,059

(22) PCT Filed: Oct. 30, 2019

(86) PCT No.: PCT/KR2019/014419
§ 371 (c)(1),
(2) Date: Apr. 20, 2022

(87) PCT Pub. No.: WO2021/085667
PCT Pub. Date: May 6, 2021

(65) Prior Publication Data
US 2022/0393349 A1 Dec. 8, 2022

(51) Int. Cl.
*H01Q 5/307* (2015.01)
*H01Q 1/24* (2006.01)
(Continued)

(52) U.S. Cl.
CPC ............ *H01Q 5/307* (2015.01); *H01Q 1/243* (2013.01); *H01Q 1/48* (2013.01); *H01Q 9/045* (2013.01);
(Continued)

(58) Field of Classification Search
CPC .......... H01Q 5/307; H01Q 1/243; H01Q 1/48; H01Q 9/045; H01Q 21/06; H04B 1/40; H04B 7/0413
See application file for complete search history.

(56) References Cited

U.S. PATENT DOCUMENTS 7,315,284 B2 *  1/2008 Hsu .......................... H01Q 9/42
                                                        343/702
9,620,867 B2 *  4/2017 Hamabe ................. H01Q 21/28
(Continued)

FOREIGN PATENT DOCUMENTS

KR    10-20070060818     6/2007
KR    10-2013-0017274    2/2013
KR    10-2015-0118481    10/2015

OTHER PUBLICATIONS

PCT International Application No. PCT/KR2019/014419, International Search Report dated Aug. 27, 2020, 4 pages.
Abu Saada et al., "Design of Efficient Microstrip Linear Antenna Array for 5G Communications Systems," 2017 International Conference on Promising Electronic Technologies (ICPET), Oct. 2017, 7 pages.

*Primary Examiner* — Justin Y Lee
(74) *Attorney, Agent, or Firm* — LEE, HONG, DEGERMAN, KANG & WAIMEY

(57) ABSTRACT

Provided is an electronic device provided with a 5G antenna according to the present invention. The electronic device is provided with a first antenna including: a metal pattern in which metal having a predetermined length and a predetermined width is printed and disposed on the entire surface of a substrate, and which is configured to radiate a first signal; and a feeding pattern which is disposed inside a region in which the metal pattern is separated and spaced, and configured to couple-feed the first signal to the metal pattern. Further, the electronic device further comprises a second antenna that includes a metal pattern and a second feeding pattern arranged to be symmetric to the first antenna on the
(Continued)

entire surface of the substrate, wherein the second antenna is configured to radiate a second signal.

17 Claims, 21 Drawing Sheets

(51) Int. Cl.
    *H01Q 1/48*     (2006.01)
    *H01Q 9/04*     (2006.01)
    *H01Q 21/06*     (2006.01)
    *H04B 1/40*     (2015.01)
    *H04B 7/0413*     (2017.01)

(52) U.S. Cl.
    CPC ............... *H01Q 21/06* (2013.01); *H04B 1/40* (2013.01); *H04B 7/0413* (2013.01)

(56) References Cited

U.S. PATENT DOCUMENTS

| | | | | |
|---|---|---|---|---|
| 2005/0104681 | A1* | 5/2005 | Allen | H01P 5/187 333/33 |
| 2006/0044186 | A1* | 3/2006 | Coppi | H01Q 9/0421 343/700 MS |
| 2009/0256767 | A1* | 10/2009 | Kan | H01Q 9/285 343/795 |
| 2011/0260943 | A1* | 10/2011 | Felic | H01Q 23/00 29/601 |
| 2017/0141465 | A1* | 5/2017 | Sharawi | H01Q 1/521 |
| 2019/0165476 | A1* | 5/2019 | Hong | H01Q 21/065 |
| 2020/0052405 | A1* | 2/2020 | Park | H02J 50/20 |

* cited by examiner (a)

(b)

(a)

(b)

(a)

(b)

(c)

ELECTRONIC DEVICE PROVIDED WITH 5G ANTENNA

CROSS-REFERENCE TO RELATED APPLICATIONS

This application is the National Stage filing under 35 U.S.C. 371 of International Application No. PCT/KR2019/014419, filed on Oct. 30, 2019, the contents of which is hereby incorporated by reference herein in its entirety.

TECHNICAL FIELD

The present disclosure relates to an electronic device provided with a 5G antenna. One particular implementation relates to an electronic device having a low-profile antenna operating in a 5G Sub 6 band.

BACKGROUND ART

Electronic devices may be classified into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mm-Wave) band in addition to the Sub-6 band for a faster data rate.

Meanwhile, an antenna operating in a 5G Sub 6 band may be disposed on a side surface of an electronic device or inside the electronic device. In recent years, there is a tendency to adopt full displays in electronic devices such as mobile terminals. In addition to electronic devices having full displays, new form-factors in foldable, flexible, and rollable forms are emerging by the development of flexible displays.

Even in electronic devices according to such various form-factors, the number of antennas is increasing for fast data transmission. However, since the size and shape of antennas that can be disposed in an electronic device is limited, there are problems in view of a reduction of a design space and a difficulty in securing radiation efficiency.

In addition, although four antennas can be used in the current 5G communication system, 8 or more antennas may be needed in the future 5G communication system or 6G communication system. In this regard, the future communication systems may require more antennas for large-capacity and high-speed data transmission. However, due to the limitation to the size and shape of antennas that can be disposed in an electronic device, there are problems in view of a reduction of a design space and a difficulty in securing radiation efficiency.

DISCLOSURE OF INVENTION

Technical Problem

The present disclosure is directed to solving the aforementioned problems and other drawbacks. The present disclosure describes an electronic device in which a low-profile antenna with a small size and a high height is disposed.

The present disclosure also describes a low-profile antenna with high antenna space utilization and arrangement freedom while optimizing radio performance.

The present disclosure further describes an antenna structure capable of securing isolation between low-profile antennas while arranging the low-profile antennas to be adjacent to each other.

Solution to Problem

According to one aspect of the subject matter disclosed herein, an electronic device having a 5G antenna may be provided. The electronic device may include a first antenna having a metal pattern formed by printing a metal having a predetermined length and width on a front surface of a substrate and configured to radiate a first signal, and a feeding pattern disposed in a region defined as the metal pattern is separated to be spaced apart and configured to couple and feed a first signal to the metal pattern. The electronic device may include a second antenna having a metal pattern and a second feeding pattern disposed on the front surface of the substrate to be symmetric with the first antenna and configured to radiate a second signal. The second feeding pattern may be disposed to be offset upward from a center line of the substrate.

In one implementation, the electronic device may further include a transceiver circuit connected to the feeding pattern and the second feeding pattern and configured to radiate at least one of the first signal and the second signal through one of the first antenna and the second antenna.

In one implementation, the first antenna may further include a plurality of vias configured to connect first and second metal patterns and the lower ground pattern at an end portion of the substrate.

In one implementation, the second antenna may further include a plurality of vias configured to connect the first and second metal patterns and the lower ground pattern at an end portion of the substrate.

In one implementation, a horizontal magnetic field current may be formed in a horizontal plane with a first metal pattern and the second metal pattern defined as the metal pattern is separated and spaced in a boundary region between a boundary region of the feeding pattern and an inset region of the metal pattern and the horizontal magnetic field current may cause a height of the substrate on which the first antenna and the second antenna are formed to be reduced.

In one implementation, the metal pattern of the first antenna and the metal pattern of the second antenna may be disposed on an upper portion of the first substrate. Also, the first antenna and the second antenna may be disposed in a horizontal symmetric form with respect to a first center line of the first substrate or in a vertical symmetric form with respect to a second center line perpendicular to the first center line.

In one implementation, the second substrate may be disposed under the first substrate, and a ground layer may be further disposed on a lower portion of the second substrate to provide a reference electric potential for the antenna.

In one implementation, each of the first and second antennas may include a first radiation portion formed in a rectangular shape having a predetermined length and width, and having an inset region formed therein. Also, each of the first and second antennas may further include a second radiation portion connected to the first radiation portion and formed to be tapered at a predetermined angle to increase a width.

In one implementation, a width of the first radiation portion may be wider than a width of the second radiation portion at a point where the first radiation portion and the second radiation portion are connected. Accordingly, a coupling amount of signals from the feeding pattern to the first radiation portion can increase and an electrical length by the first antenna and the second antenna can increase.

In one implementation, each of the feeding pattern and the second feeding pattern may be disposed in the inset region inside the first radiation portion. Meanwhile, a position at which the feeding pattern is disposed may be offset by a predetermined distance from a lower end in a width direction of the first radiation portion, and a position at which the second feeding pattern is disposed may be offset by a predetermined distance from an upper end in the width direction of the first radiation portion. Accordingly, isolation characteristic s of the first antenna and the second antenna can be improved.

In one implementation, the second radiation portion of the first antenna and the second radiation portion of the second antenna may be connected to each other. This can reduce a size of an antenna module configured by the first antenna and the second antenna.

In one implementation, the second antenna may be disposed on the upper portion of the substrate to be adjacent to the first antenna. Also, the electronic device may further include a third antenna disposed adjacent to the second antenna on the upper portion of the substrate and configured to radiate a third signal through a metal pattern and a third feeding pattern. Also, the electronic device may further include a fourth antenna disposed adjacent to the third antenna on the upper portion of the substrate and configured to radiate a fourth signal through a metal pattern and a fourth feeding pattern.

In one implementation, the second radiation portion of the first antenna and the second radiation portion of the second antenna may be separated from each other by a dielectric region of the substrate. Accordingly, interference between the first antenna and the second antenna can be reduced.

In one implementation, each of the first antenna to the fourth antenna may further include a plurality of vias configured to connect the first and second metal patterns and the lower ground pattern at an end portion of the substrate. The plurality of vias may be formed in the metal patterns of the adjacent antennas that are separated from each other by the dielectric region of the substrate.

In one implementation, the first antenna and the second antenna may further include a second substrate disposed under the substrate in alignment with the substrate. Meanwhile, the ground layer disposed on the lower portion of the second substrate may be connected to a system ground in a partial region through a PCB provided in the electronic device. Also, the ground layer may be spaced apart from the system ground in a region other than the partial region. Accordingly, bandwidths of the first antenna and the second antenna can increase.

In one implementation, the ground layer may be connected to the system ground in three or more regions. In this case, the connected regions may be both end regions of the second substrate and a central region of the second substrate.

In one implementation, the electronic device may further include a 4G antenna disposed on a side surface portion of the electronic device and configured to operate in a first band that is an LTE band. Meanwhile, the first antenna and the second antenna may be 5G antennas configured to operate in a second band that is a 5G Sub 6 band. The electronic device may further include a baseband processor connected to the transceiver circuit and configured to control the transceiver circuit to transmit and receive signals through at least one of the 4G antenna and the 5G antennas.

In one implementation, the transceiver circuit may be configured to transmit and receive LTE signals of the first band and transmit and receive 5G signals of the second band. The baseband processor may control the transceiver circuit to receive the 5G signal through the 5G antenna when quality of the LTE signal is lower than or equal to a threshold.

In one implementation, the baseband processor may perform carrier aggregation (CA) when broadband transmission is requested and a broadband frequency is allocated. In this case, carrier aggregation (CA) may be performed by using the LTE signal of the first band received through the first antenna and the 5G signal of the second band received through an antenna selected based on reception performances of the first to fourth antennas.

In one implementation, 5G signals of the second band received through two antennas may be spatially combined when the two antennas are selected based on the reception performances.

In one implementation, the baseband processor may perform multi-input/multi-output (MIMO) by receiving the first signal received through the first antenna and the third signal received through the third antenna. Also, the baseband processor may perform MIMO by receiving the first signal received through the first antenna and the fourth signal received through the fourth antenna when quality of the first signal or quality of the third signal is lower than or equal to a threshold. Also, the baseband processor may perform MIMO by receiving the second signal received through the second antenna and a signal received through another antenna when quality of the first signal or quality of the fourth signal is lower than or equal to a threshold.

According to another aspect of the present disclosure, there is provided an electronic device having a plurality of antenna modules. The electronic device may include a first antenna having a metal pattern formed by printing a metal having a predetermined length and width on a front surface of the substrate and configured to radiate a first signal, and a feeding pattern disposed in a region defined as the metal pattern is separated to be spaced apart and configured to couple and feed a first signal to the metal pattern. The electronic device may further include a second antenna having a metal pattern and a second feeding pattern disposed on the front surface of the substrate to be horizontally symmetric with the first antenna and configured to radiate a second signal.

In one implementation, the electronic device may further include a transceiver circuit connected to the feeding pattern and the second feeding pattern and configured to radiate at least one of the first signal and the second signal through one of the first antenna and the second antenna. The electronic device may further include a baseband processor connected to the transceiver circuit and configured to control the transceiver circuit so that magnitudes of the first and second signals fed to the first antenna and the second antenna are varied.

Advantageous Effects of Invention

The present disclosure can provide an electronic device in which a low-profile antenna with a small size and a low height is disposed even in a full display structure.

The present invention can also provide a low-profile antenna that can be disposed inside an electronic device to be horizontal to a cover of the electronic device, so as to secure high antenna space utilization and arrangement freedom while optimizing wireless performance.

The present disclosure can further provide a 1×n MIMO antenna module capable of securing isolation between low-profile antennas disposed adjacent to each other.

According to the present disclosure, antenna patterns disposed between feeding patterns can serve as antenna radiators, respectively, and also provide a de-coupling effect, thereby improving antenna isolation (S21 and ECC).

In particular, the low-profile antenna can be effectively designed to have a very low height of 0.02λ, or lower, and can easily implement impedance matching.

In particular, the low-profile antenna may have a radiator with both end portions shorted, which can be advantageous in view of arranging plural antennas by virtue of miniaturization of antennas and improvement of isolation between antennas.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

MODE FOR THE INVENTION

Figure 1A:
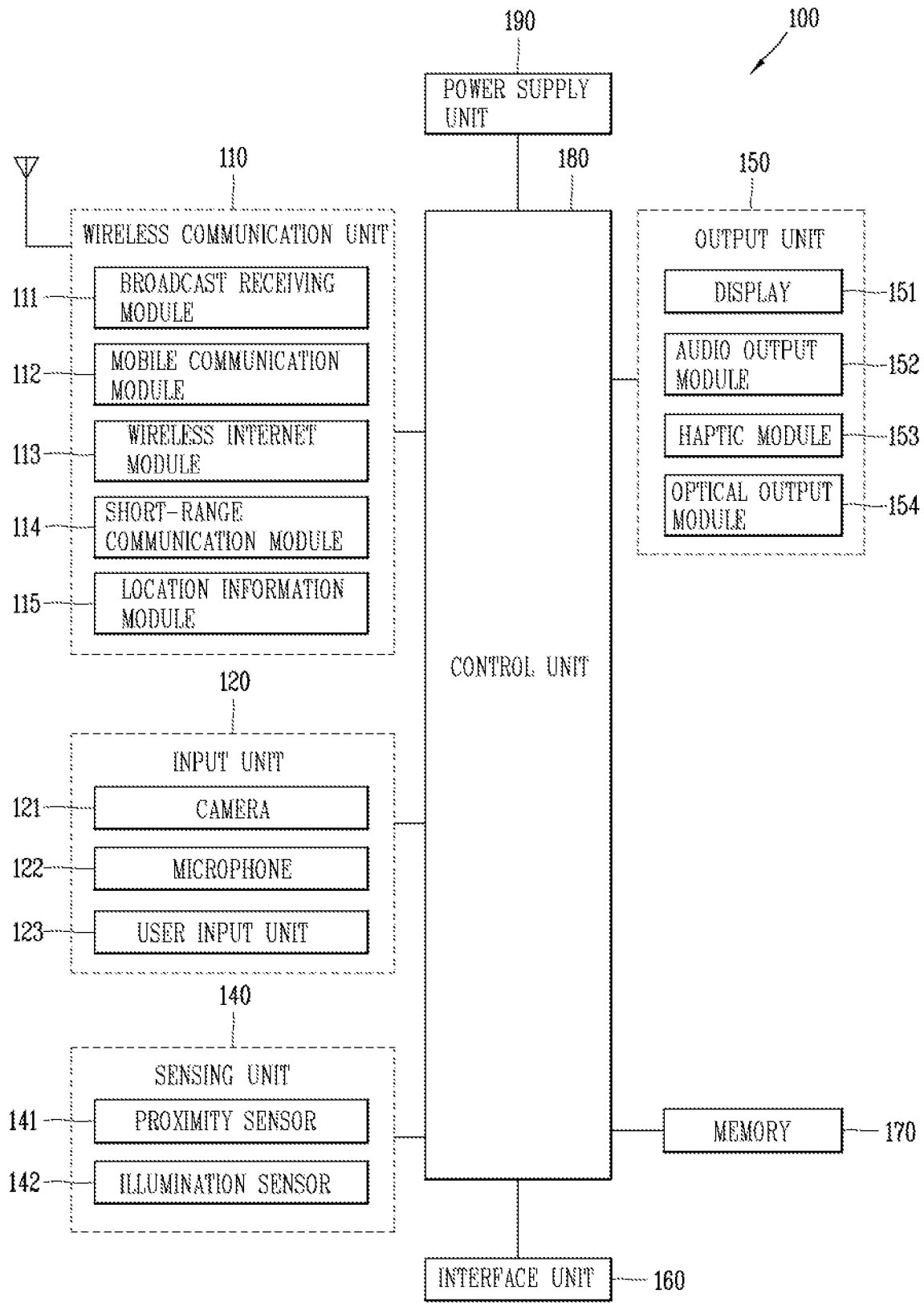
FIG. 1A is a block diagram of an electronic device in accordance with one implementation.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 1B:
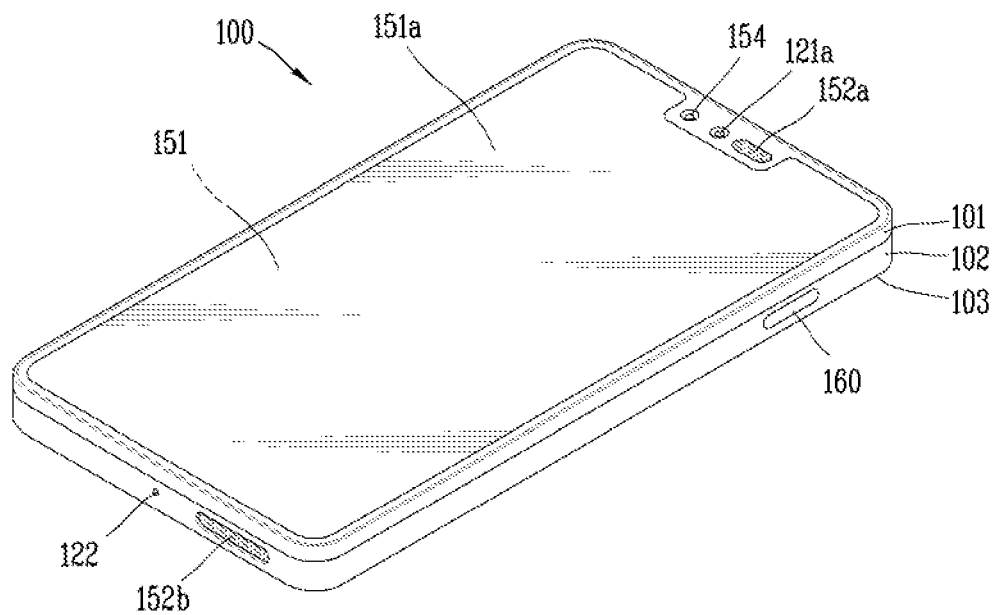
FIGS. 1B and 1C are conceptual views illustrating one example of the electronic device, viewed from different directions.
Figure 1C:
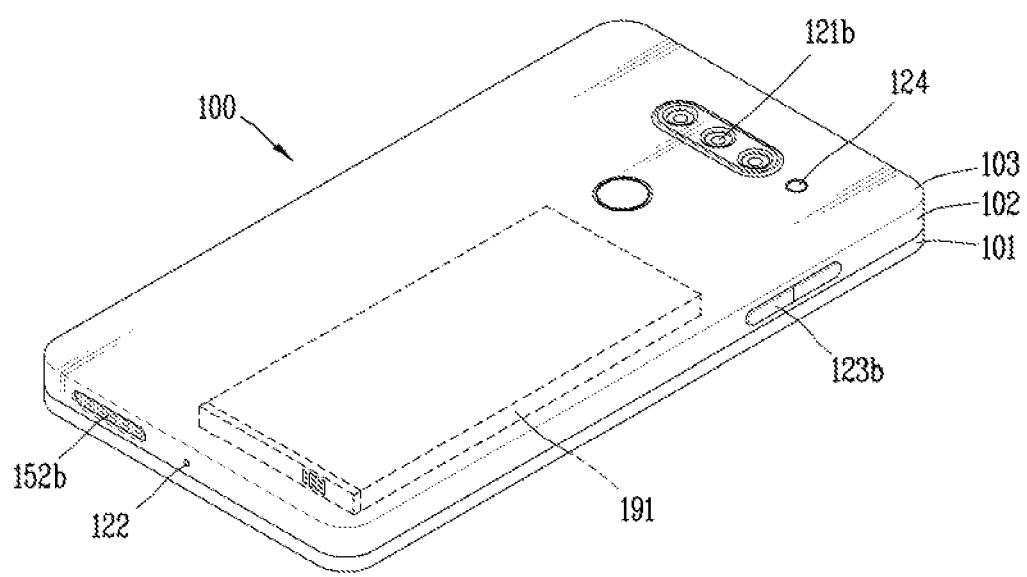

Referring to FIGS. 1A to 1C, FIG. 1A is a block diagram of an electronic device in accordance with one implementation of the present disclosure, and FIGS. 1B and 1C are conceptual views illustrating one example of an electronic device according to the present disclosure, viewed from different directions.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components illustrated in FIG. 1A is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperably operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIGS. 1B and 1C, the disclosed electronic device 100 includes a bar-like terminal body. However, the present disclosure may not be necessarily limited to this, and may be also applicable to various structures such as a watch type, a clip type, a glasses type, a folder type in which two or more bodies are coupled to each other in a relatively movable manner, a flip type, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components may be incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121*b* or an audio output module 152*b*.

The electronic device 100 may include a display unit 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a control unit 180 may generate a control command corresponding to the touch. Contents input in the touch manner may be characters, numbers, instructions in various modes, or a menu item that can be specified.

In this way, the display unit 151 may form a touch screen together with the touch sensor, and in this case, the touch screen may function as the user input unit (123, see FIG. 1A). In some cases, the touch screen may replace at least some of functions of a first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia playback sounds.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the control unit 180 may control the optical output module 154 to stop the light output.

The first camera 121*a* may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a finger scan sensor which scans a user's fingerprint. The controller 180 may use fingerprint information sensed by the finger scan sensor as an authentication means. The finger scan sensor may be installed in the display unit 151 or the user input unit 123.

The microphone 122 may be provided at a plurality of places, and configured to receive stereo sounds. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter-wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, description will be given of embodiments of a multi-transmission system and an electronic device having the same, specifically, an electronic device operating in a heterogeneous radio system, with reference to the accompanying drawings. It will be apparent to those skilled in the art that the present disclosure may be embodied in other specific forms without departing from the idea or essential characteristics thereof.

Hereinafter, embodiments related to an antenna device having such configuration and a mobile terminal having the antenna device will be described with reference to the accompanying drawings. It will be apparent to those skilled in the art that the present disclosure may be embodied in other specific forms without departing from the idea or essential characteristics thereof.

Figure 2A:
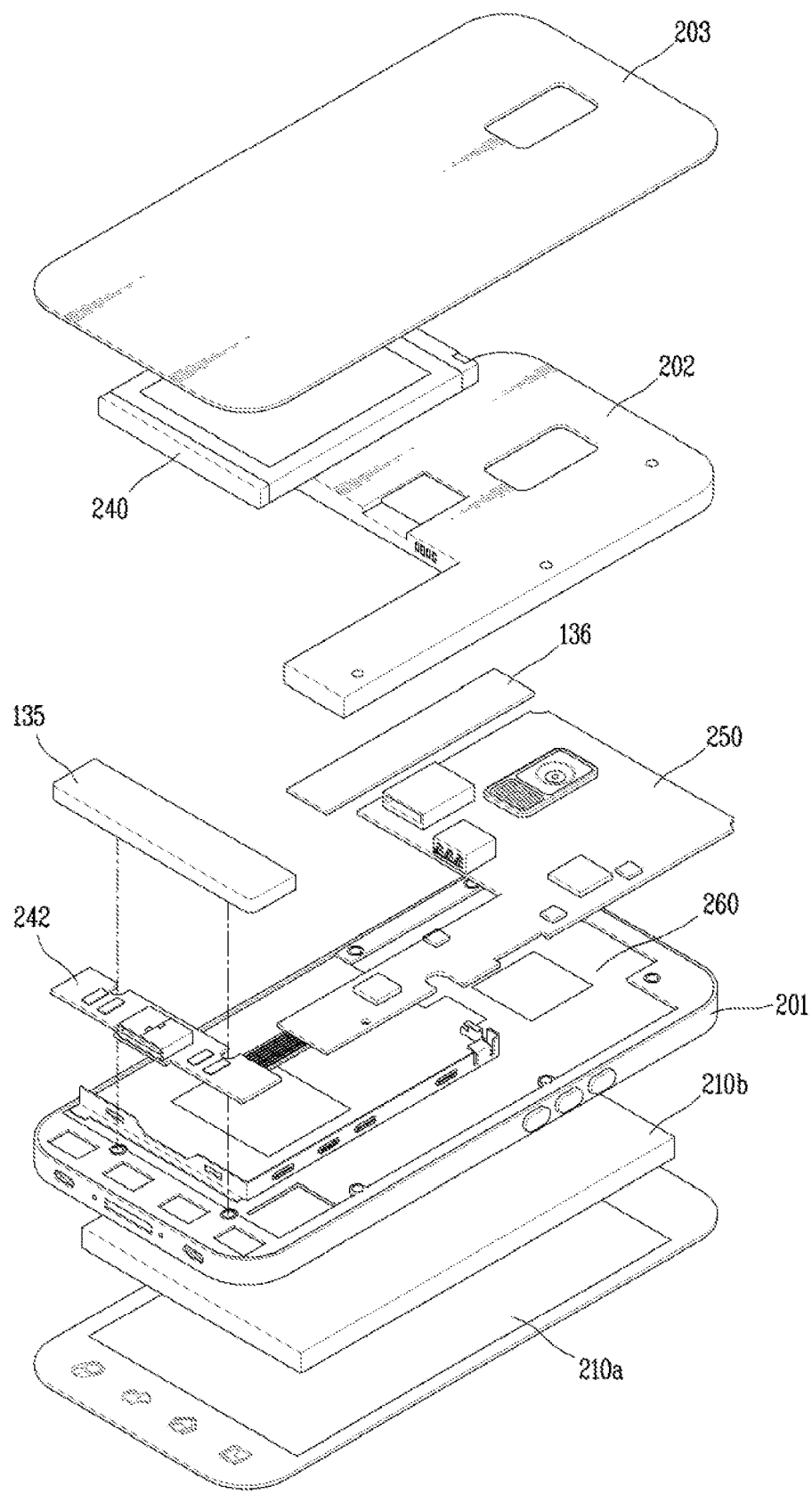
FIG. 2A is an exploded perspective view illustrating a mobile terminal in accordance with one implementation.

First, FIG. 2A is an exploded perspective view of a mobile terminal according to one embodiment of the present invention. Referring to FIG. 2, the mobile terminal includes a window 210a and a display module 210b, which constitute the display unit 210. The window 210a may be coupled to one surface of the front case 201. The window 210a and the display module 210b may be integrally formed with each other.

A frame 260 is formed between the front case 201 and the rear case 202 to support electric elements. In this regard, when the front case 201 and the rear case 202 are made of a metal, they may be referred to as a metal frame. However, the example in which the front case 201 is the metal frame 201 is disclosed for the sake of explanation, but the present invention is not limited to this. Alternatively, at least one of the front case 201 and the rear case 202 may be realized as a metal frame made of a metal material. On the other hand, at least part of the side surface of the metal frame 201 may operate as an antenna.

The frame 260 is a support structure inside the terminal. As one example, the frame 260 may support at least one of the display module 210b, the camera module 221, an antenna device, a battery 240 or a circuit board 250.

A part of the frame 260 may be exposed to the outside of the terminal. Also, the frame 260 may constitute a part of a sliding module that connects the main body and the display unit to each other in a slide type terminal, not a bar type.

FIG. 2 shows one example in which the circuit board 250 is disposed between the frame 260 and the rear case 202 and the display module 210b is coupled to one surface of the frame 260. The circuit board 250 and the battery may be disposed on another surface of the frame 260 and a battery cover 203 may be coupled to the rear case 202 to cover the battery.

The window 210a is coupled to one surface of the front case 201. A touch detecting pattern 210c for detecting a touch may be formed on one surface of the window 210a.

The touch detecting pattern 210c is configured to detect a touch input, and is made to be light-transmissive. The touch detecting pattern 210c may be mounted on the front surface of the window 210a and may be configured to convert a change in voltage or the like generated in a specific portion of the window 210a into an electrical input signal.

The display module 210b is mounted on a rear surface of the window 210a. This embodiment exemplarily illustrates that the display module 210b is a thin film transistor-liquid crystal display (TFT LCD), but the present invention is not limited thereto.

For example, the display module 210b may be a liquid crystal display (LCD), an organic light-emitting diode (OLED), a flexible display, a three-dimensional display, and the like.

As described above, the circuit board 250 may be provided on one surface of the frame 260, but may alternatively be mounted on the lower portion of the display module 210b. At least one electronic element is mounted on a lower surface of the circuit board 250.

The frame 260 is provided with an accommodating portion formed in a recessed shape such that the battery 240 can be accommodated therein. A contact terminal connected to the circuit board 250 may be provided on one surface of the battery accommodating portion so that the battery 240 can supply power to the terminal body.

The frame 260 may be formed of a metal material to maintain sufficient rigidity even if the frame 260 is formed to have a small thickness. The metal frame 260 may operate as a ground. That is, the circuit board 250 or the antenna device may be grounded to the frame 260, and the frame 260 may operate as the ground of the circuit board 250 or the antenna device. In this case, the frame 260 may extend the ground of the mobile terminal.

The circuit board 250 is electrically connected to the antenna device and is configured to process radio signals (or radio electromagnetic waves) transmitted and received through the antenna device. For the processing of the radio signals, a plurality of transceiver circuits may be formed or mounted on the circuit board 250.

The transceiver circuits may include one or more integrated circuits and associated electrical components. In one example, the transceiver circuits may include a transmission integrated circuit, a reception integrated circuit, a switching circuit, an amplifier, and the like.

The plurality of transceiver circuits may simultaneously feed conductive members with a conductive pattern that is an emitter, so that a plurality of antenna devices can operate simultaneously. For example, while one antenna performs transmission, another one may perform reception, or both of them may perform transmission or reception.

A coaxial cable may be provided to connect the circuit board and each antenna device to each other. In one example, the coaxial cable may be connected to feeders that feed the antenna devices. The feeders may be provided on one surface of a flexible printed circuit board 242 which processes signals input from the manipulation unit 123a. Another surface of the flexible printed circuit board 242 may be coupled to a signal transfer unit which is configured to transmit a signal of the manipulation unit 123a. In this case, a dome may be formed on the another surface of the flexible printed circuit board 242, and an actuator may be provided on the signal transfer unit.

The flexible printed circuit board 242 may be connected to a lower portion of a carrier 135. One end of the flexible printed circuit board 242 may be connected to the circuit board 250 which is provided with a controller. A carrier 136 may be disposed in a side surface of the electronic device rather than in a lower portion of the electronic device. The carrier 136 may be connected to the flexible printed circuit board or the circuit board 250. The flexible printed circuit board 242 or the circuit board 250 may be connected to a manipulation unit of the terminal. In this case, the flexible printed circuit board 242 may be configured such that a signal generated by the manipulation unit is transmitted to the controller of the circuit board 250.

Meanwhile, the present disclosure may consider an electronic device in which at least portions of the side surfaces of the metal frame 201 or a plurality of conductive patterns therein operate as antennas. In this regard, the plurality of conductive patterns inside the metal frame 201 may operate as a plurality of antenna elements.

In the configuration disclosed herein, when implementing a 5G Sub 6 antenna, the outer metal frame 201, that is, a metal decoration, may be used as the ground (GND) of two antennas of the same frequency. Each of the two antenna patterns connected to the metal decoration may be a main radiator.

Accordingly, the metal decoration corresponding to the outer metal frame 201 may be a ground, and become a common ground of the plurality of antennas. In addition, there may exist an antenna pattern, that is, a conductive pattern, in contact with the metal decoration and the conductive pattern may serve as a main radiator.

Hereinafter, a low-profile antenna that can be disposed inside the electronic device other than on the side surface of the electronic device will be described. Since the existing antennas are already disposed on the side surfaces of the electronic device, a space for arranging a plurality of antennas which can operate in the 5G Sub 6 band may be insufficient or interference with other antennas may occur. In order to solve this problem, the low-profile antenna may be implemented to be small in size and low in height inside the electronic device.

The present disclosure also provides an antenna miniaturization design technology for applying MIMO of 4×4 or higher. Specifically, the present disclosure proposes a method for optimally arranging a 5G sub-6 GHz antenna in a low-profile antenna structure implemented with a small size and low height inside an electronic device.

Figure 2B:
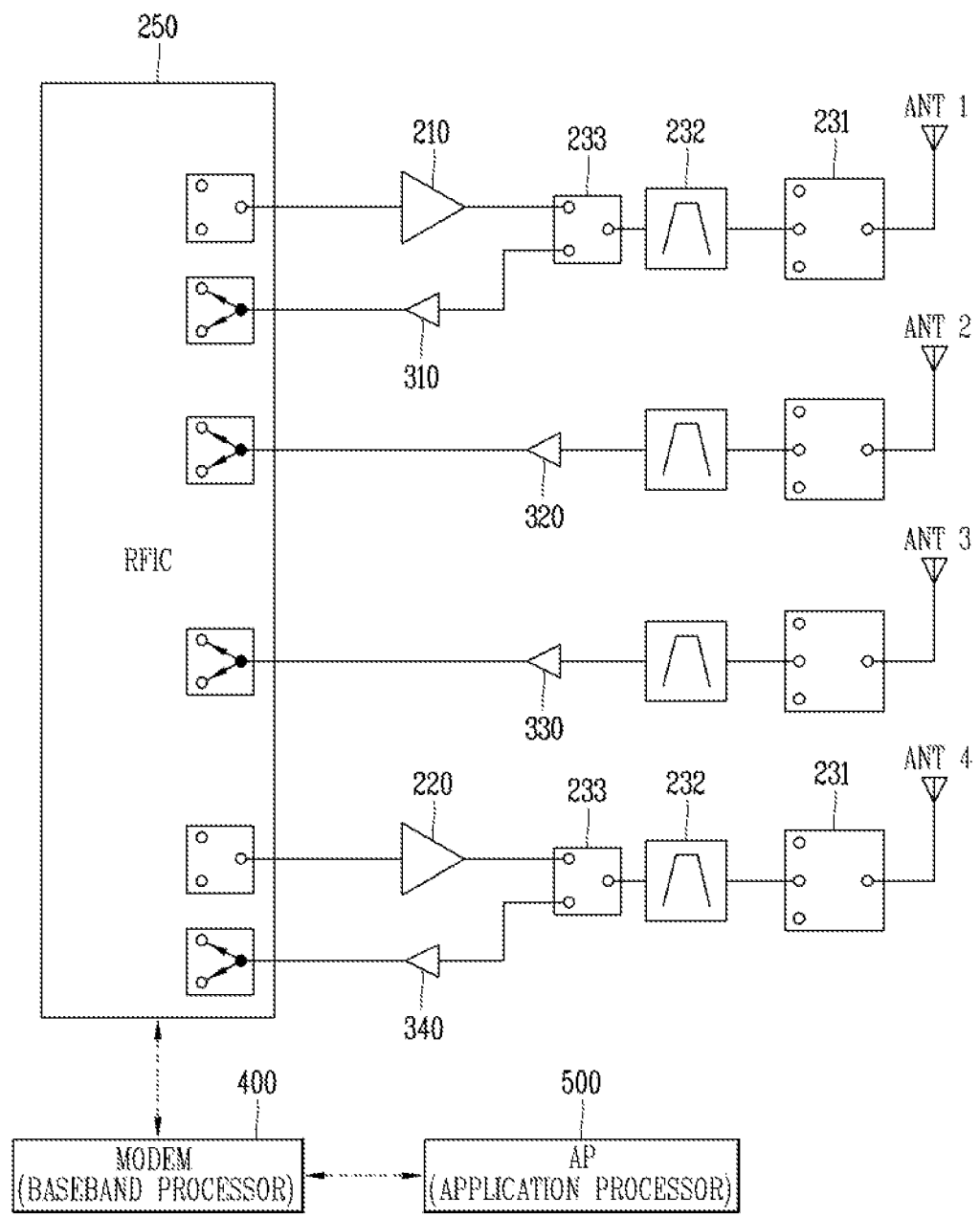
FIG. 2B is a block diagram illustrating an exemplary configuration of a wireless communication unit of an electronic device that can operate in a plurality of wireless communication systems.

FIG. 2B is a block diagram illustrating an exemplary configuration of a wireless communication unit of an electronic device that can operate in a plurality of wireless communication systems. Referring to FIG. 2B, the electronic device may include a first power amplifier 210, a second power amplifier 220, and an RFIC 250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure may not be limited thereto and may be implemented in the form of a chip that is physically separated according to an application.

Meanwhile, the electronic device may include a plurality of low noise amplifiers (LNAs) 410 to 440 in the receiver. Here, the first power amplifier 210, the second power amplifier 220, the RFIC 250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2, the RFIC 250 may be configured as a 4G/5G integrated type, but the present disclosure may not be limited thereto. The RFIC 250 may be configured as a 4G/5G separate type according to an application. When the RFIC 250 is configured as the 4G/5G integrated type, it may be advantageous in terms of synchronization between 4G and 5G circuits, and simplification of control signaling by the modem 400.

On the other hand, when the RFIC 250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 250 may be configured as a 4G/5G separated type. As such, when the RFIC 250 is configured as the 4G/5G separate type, there may be an advantage that the RF characteristics can be optimized for each of the 4G band and the 5G band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 500 may be configured to control the operation of each component of the electronic device. Specifically, the application processor (AP) 500 may control the operation of each component of the electronic device through the modem 400.

For example, the modem 400 may be controlled through a power management IC (PMIC) for low power operation of the electronic device. Accordingly, the modem 400 may operate power circuits of a transmitter and a receiver through the RFIC 250 in a low power mode.

In this regard, when it is determined that the electronic device is in an idle mode, the application processor (AP) 500 may control the RFIC 250 through the modem 300 as follows. For example, when the electronic device is in an idle mode, the application processor 280 may control the RFIC 250 through the modem 400, such that at least one of the first and second power amplifiers 110 and 120 operates in the low power mode or is turned off.

According to another embodiment, the application processor (AP) 500 may control the modem 400 to provide wireless communication capable of performing low power communication when the electronic device is in a low battery mode. For example, when the electronic device is connected to a plurality of entities among a 4G base station, a 5G base station, and an access point, the application processor (AP) 500 may control the modem 400 to enable wireless communication at the lowest power. Accordingly, even though a throughput is slightly sacrificed, the application processor (AP) 500 may control the modem 400 and the RFIC 250 to perform short-range communication using only the short-range communication module 113.

According to another implementation, when a remaining battery capacity of the electronic device is equal to or greater than a threshold value, the application processor 1450 may control the modem 300 to select an optimal wireless interface. For example, the application processor (AP) 500 may control the modem 400 to receive data through both the 4G base station and the 5G base station according to the remaining battery capacity and the available radio resource information. In this case, the application processor (AP) 500 may receive the remaining battery capacity information from the PMIC and the available radio resource information from the modem 400. Accordingly, when the remaining battery capacity and the available radio resources are sufficient, the application processor (AP) 500 may control the modem 400 and the RFIC 250 to receive data through both the 4G base station and 5G base station.

Meanwhile, in a multi-transceiving system of FIG. 2, a transmitter and a receiver of each radio system may be integrated into a single transceiver. Accordingly, a circuit portion for integrating two types of system signals may be removed from an RF front-end.

Furthermore, since the front end parts can be controlled by an integrated transceiver, the front end parts may be more efficiently integrated than when the transceiving system is separated by communication systems.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems.

On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is a millimeter wave (mmWave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller.

In addition, the electronic device that is operable in the plurality of wireless communication systems according to an embodiment may further include a duplexer 231, a filter 232, and a switch 233.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, signals in a reception band received through the antennas ANT1 and ANT4 are received by the low noise amplifiers 310 and 340 through a second output port of the duplexer 231.

The filter 232 may be configured to pass a signal in a transmission band or a reception band and to block a signal in a remaining band. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. In this case, the transmission signal and the reception signal may be in the same frequency band, and thus the duplexer 231 may be implemented in a form of a circulator.

Meanwhile, in another implementation of the present disclosure, the switch 233 may also be applied to a frequency division multiplex (FDD) scheme. In this case, the switch 233 may be configured in the form of a double-pole double-throw (DPDT) to connect or block a transmission signal and a reception signal, respectively. On the other hand, since the transmission signal and the reception signal can be separated by the duplexer 231, the switch 233 may not be necessarily required.

Meanwhile, the electronic device according to the present disclosure may further include a modem 400 corresponding to the controller. In this case, the RFIC 250 and the modem 400 may be referred to as a first controller (or a first processor) and a second controller (a second processor), respectively. On the other hand, the RFIC 250 and the modem 400 may be implemented as physically separated circuits. Alternatively, the RFIC 250 and the modem 400 may be logically or functionally distinguished from each other on one physical circuit.

The modem 400 may perform controlling of signal transmission and reception and processing of signals through different communication systems using the RFID 250. The modem 400 may acquire control information from a 4G base station and/or a 5G base station. Here, the control information may be received through a physical downlink control channel (PDCCH), but may not be limited thereto.

The modem 400 may control the RFIC 250 to transmit and/or receive signals through the first communication system and/or the second communication system for a specific time interval and from frequency resources. Accordingly, the RFIC 250 may control transmission circuits including the first and second power amplifiers 210 and 220 to transmit a 4G signal or a 5G signal in the specific time interval. In addition, the RFIC 250 may control reception circuits including the first to fourth low noise amplifiers 310 to 340 to receive a 4G signal or a 5G signal at a specific time interval.

Hereinafter, a low-profile antenna that can be disposed inside an electronic device according to the present disclosure will be described. Here, the term "low-profile" means that it is formed to have a low height and can be disposed inside the electronic device.

An antenna operating in a 5G Sub 6 band may be disposed on a side surface of an electronic device or inside the electronic device. In recent years, there is a tendency to adopt full displays in an electronic device such as a mobile terminal. In addition to electronic devices having full displays, new form-factors in foldable, flexible, and rollable forms are emerging by the development of flexible displays.

Even in electronic devices according to such various form-factors, the number of antennas is increasing for fast data transmission. However, since the size and shape of antennas that can be disposed in an electronic device is limited, there are problems in view of a reduction of a design space and a difficulty in securing radiation efficiency.

In order to solve these problems, the present disclosure provides a low-profile antenna that can be disposed inside full displays or electronic devices of various form-factors. Accordingly, the present disclosure describes an electronic device in which a low-profile antenna with a small size and a high height is disposed. The present disclosure also describes a low-profile antenna with high antenna space utilization and arrangement freedom while optimizing radio performance.

The present disclosure further describes an antenna capable of being disposed inside an electronic device, rather than on a lateral edge of the electronic device, which is a region on which existing antennas are concentrated. The present disclosure further describes an effective design of a low-profile antenna which has a low height to be disposed inside a cover of an electronic device in parallel to the cover.

Meanwhile, although four antennas can be used in the current 5G communication system, 8 or more antennas may be needed in the future 5G communication system or 6G communication system. In this regard, the future communication systems may require more antennas for large-capacity and high-speed data transmission. However, due to the limitation to the size and shape of antennas that can be disposed in the electronic device, there are problems in view of a reduction of a design space and a difficulty in securing radiation efficiency.

Accordingly, an aspect of the present disclosure is to provide a 1×n MIMO antenna module capable of securing a degree of isolation between low-profile antennas while disposing the low-profile antennas adjacent to each other. To this end, antenna elements in the 1×n MIMO antenna module may be rotated and feeding points may be spaced apart from each other. Here, the phrase "spacing the feeding points from each other" means that feeders are offset and antenna elements are rotated so that a distance between the antenna elements increases.

On the other hand, separation performance between the antennas may be improved by increasing the distance between the antennas while expanding an area in which the ground of the substrate having the antennas and the system ground are connected. In addition, in case where a metal structure is located under an antenna ground, parasitic resonance or ECC issues can be avoided only when the metal structure is in contact with a via (pattern shorting portion).

Meanwhile, referring to FIG. 2A, the low-profile antenna may be disposed on the carrier 136. In one example, the carrier 136 on which the low-profile antenna is arranged may be disposed in the longitudinal direction of the electronic device. When the low-profile antenna is disposed in the longitudinal direction of the electronic device, MIMO may be implemented by arranging a plurality of low-profile antennas.

In relation to the MIMO, antenna elements generally need to be spaced apart from one another by 5 wavelengths or more of an operating band. In order for the antenna elements to be spaced apart by the 5 wavelengths or more, the antenna elements, for example, 5G 2×2 MIMO antennas may be disposed on an upper left portion, a lower left portion, an upper right portion, and a lower right portion of the electronic device. The 5G 2×2 MIMO antennas disposed in the upper left, lower left, upper right and lower right portions may cause interference with 4G MIMO antennas.

Therefore, the present disclosure describes a 5G MIMO antenna in which antenna elements are disposed to be very close to each other in a limited space on the carrier 136 inside the electronic device. The antenna elements constituting the 5G MIMO antenna may be disposed adjacent to each other at a distance of about a half wavelength or a quarter wavelength. Therefore, the 5G MIMO antenna can be changed to 2×1 MIMO antenna, 2×2 MIMO antenna, and m×n MIMO antenna according to applications.

As described above, the low-profile antenna that may be disposed inside the electronic device may be an antenna operating in the 5G Sub 6 band. However, the present disclosure may not be limited thereto, and the low-profile antenna may be an antenna operating in an LTE band according to an application.

Figure 3A:
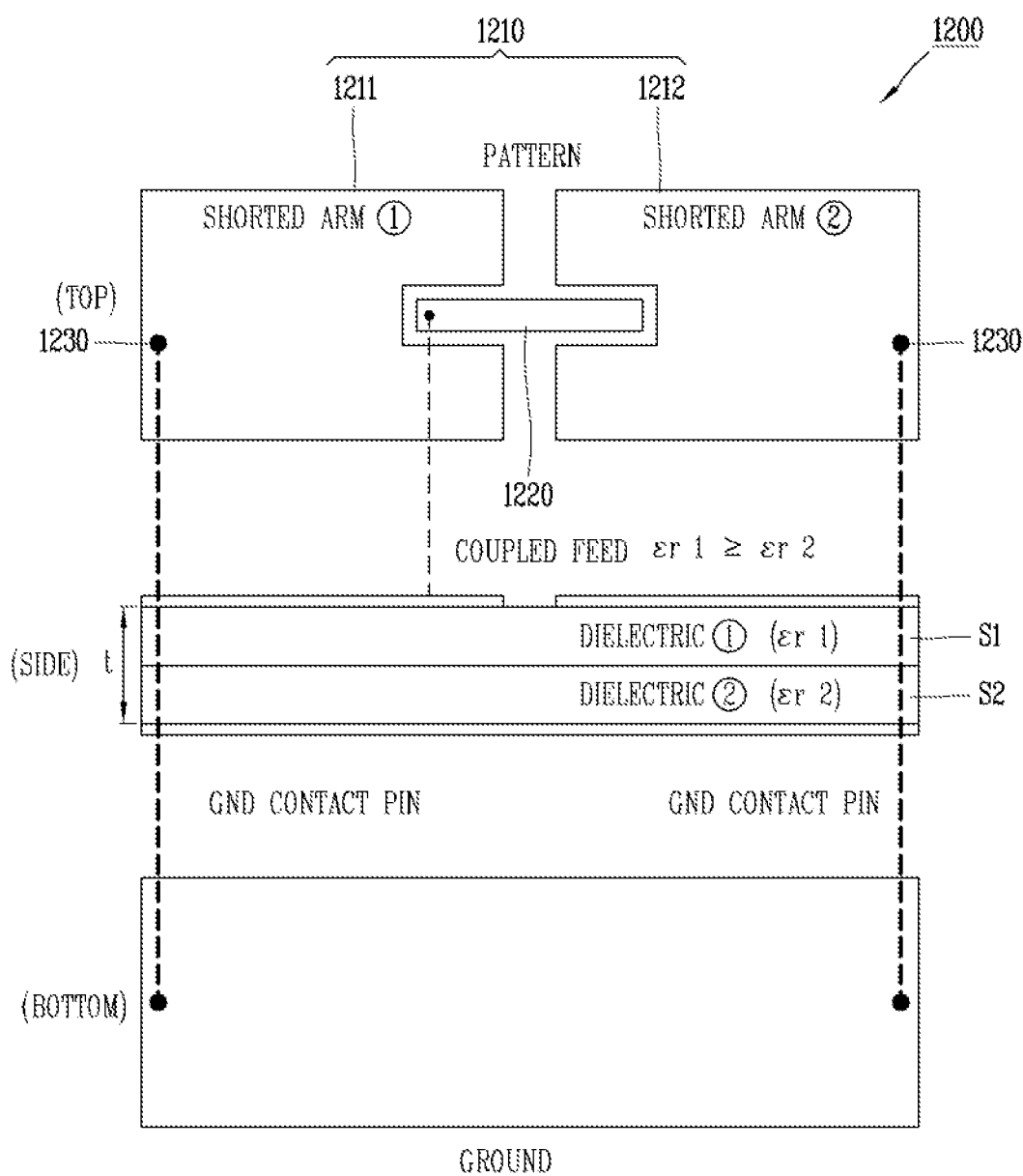
FIG. 3A is a view illustrating a top, side, and bottom of a substrate on which a low-profile antenna according to the present disclosure is implemented.
Figure 3B:
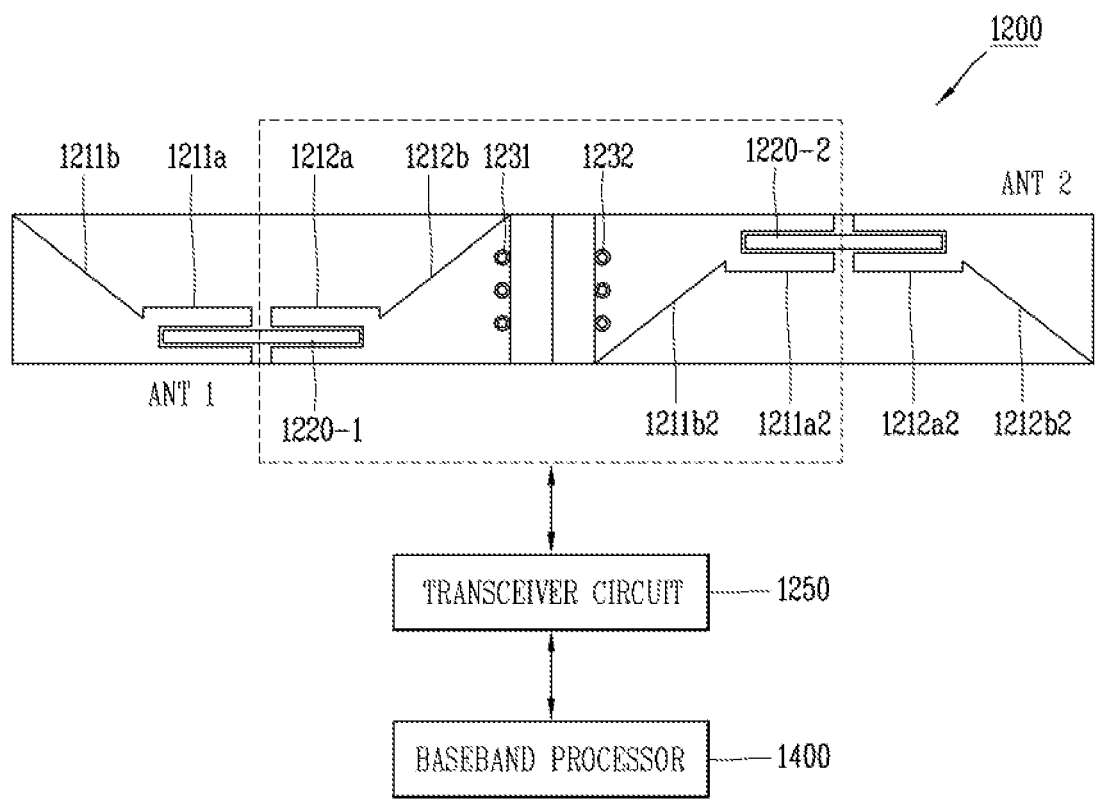
FIG. 3B is a view illustrating a MIMO antenna module and a transceiver circuit for transmitting and receiving signals through the antenna.

FIG. 3A is a view illustrating a top, side, and bottom of a substrate on which a low-profile antenna according to the present disclosure is implemented. FIG. 3B is a view illustrating a MIMO antenna module and a transceiver circuit for transmitting and receiving signals through the antenna. Technical features of the low-profile antenna may be described as follows.

1) Open surfaces of two metal patterns each with one end shorted are disposed to face each other at a distance from each other. The biggest structural feature is that feeding is made by indirect coupling in the same layer or different layers between the two metal patterns. By adjusting the distance, impedance matching can be easily performed.

2) The metal pattern and the ground have a low height therebetween and dielectric or air is filled between them. An antenna size can be reduced and radiation efficiency can be enhanced by stacking two or more different dielectrics.

3) A horizontal magnetic field current is generated by a vertical current flowing through a vertical connection portion connecting the metal pattern and the ground and a vertical electric field generated between the metal pattern and the ground. This horizontal magnetic field current is very efficient at a low antenna height according to an image theory.

Here, the low-profile antenna may be referred to as an ultra-miniaturized antenna. In this regard, the term "ultra-miniaturized antenna" means that a plurality of antenna elements can be arranged inside the electronic device by reducing length and width of the substrate where the antenna patterns are disposed.

Referring to FIG. 3A, an antenna according to the present disclosure may be characterized in that two patterns (Shorted arms ① and ②) each with one end shorted are disposed to face each other at a distance therebetween, and feeding is made by indirect coupling between the patterns.

This structure can induce effective radiation of the antenna at a low height t. In this regard, a horizontal magnetic field current is generated by a vertical current flowing through a vertical connection portion connecting the metal pattern and the ground and a vertical electric field generated between the metal pattern and the ground. This horizontal magnetic field current is very efficient at a low antenna height according to an image theory.

Specifically, referring to FIGS. 3A and 3B, the electronic device may include an antenna 1200, a transceiver circuit 1250, and a baseband processor 1400. Here, the transceiver circuit 1250 may be an RFIC that is an integrated circuit operating in an RF band. Also, the baseband processor 1400 may be a modem operating in a baseband. In this case, the RFIC may include a down-converter for converting an RF band signal into a baseband signal and an up-converter for converting a baseband signal into an RF band signal. The transceiver circuit 1250 corresponding to the RFIC and the baseband processor 1400 corresponding to the modem may be disposed in one chip to be implemented as a Soc (System On Chip).

The antenna 1200 may include a first metal pattern 1211, a second metal pattern 1212, and a feeding pattern 1220. The first metal pattern 1211 may be configured such that a metal having a predetermined length and width is printed on a front surface of the substrate. The second metal pattern 1212 may be spaced apart from the first metal pattern 1211 by a predetermined distance, and may be configured such that a metal having a predetermined length and width is printed. Each of the first metal pattern 1211 and the second metal pattern 1212 may have an inset region in which a metal pattern is not formed.

Here, the term "inset region" means a region removed from a metal region of each of the first metal pattern 1211 and the second metal pattern 1212 like rectangular patches. A space for arranging the feeding pattern 1220 can be secured by the "inset region". In addition, impedance matching between the first metal pattern 1211 and the second metal pattern 1212 and the feeding pattern 1220 can be easily implemented through the "inset region" without a separate impedance matching circuit.

The feeding pattern 1220 may be configured such that a metal having a predetermined length and width is printed in a region where the first metal pattern 1211 and the second metal pattern 1212 are spaced apart from each other and the inset region. Accordingly, the feeding pattern 1220 can perform coupling feeding for signals to the first metal pattern 1211 and the second metal pattern 1212.

A position of a feeder at which the feeding pattern 1220 is connected to the transceiver circuit 1250 may be spaced apart from the center of the feeding pattern 1220 by a predetermined distance. As the feeding pattern 1220 is spaced apart by a predetermined distance, impedance matching can be facilitated and bandwidth characteristics can be optimized. On the other hand, a threshold that the position of the feeder is spaced apart from the center of the feeding pattern 1220 by the predetermined distance may be set to a degree to allow asymmetry of the radiation pattern of the antenna.

The transceiver circuit 1250 may be connected to the feeding pattern 1220 to transmit signals to the first metal pattern 1211 and the second metal pattern 1212 through the feeding pattern 1220. The baseband processor 1400 may control the transceiver circuit 1250 to transmit and receive signals of the 5G Sub 6 band through the antenna 1200.

On the other hand, the antenna 1200 may further include a plurality of vias 1230. In this regard, the plurality of vias 1230 may be formed at end portions of the first metal pattern 1211 and the second metal pattern 1212 to connect the first metal pattern 1211 and the second metal pattern 1212 and a lower ground pattern. The plurality of vias 1230 may be disposed at terminated portions of the first metal pattern 1211 and the second metal pattern 1212 to be spaced inwardly apart from one another by predetermined distances.

Meanwhile, the low-profile antenna may include a first antenna ANT1 and a second antenna ANT2 for performing a MIMO operation. The first antenna ANT1 may include metal patterns 1211a, 1211b, 1212a, and 1212b and a feeding pattern 1220-1.

The metal patterns 1211a, 1211b, 1212a, and 1212b of the first antenna ANT1 may be configured such that a metal having a predetermined length and width is printed on the front surface of the substrate to radiate a first signal. The feeding pattern 1220-1 may be disposed at a position offset downward from the center line of the substrate in a region defined as the metal patterns 1211a, 1211b, 1212a, and 1212b are separated and spaced from each other. Accordingly, the feeding pattern 1220-1 can perform coupling feeding for the first signal to the metal patterns 1211a, 1211b, 1212a, and 1212b.

On the other hand, the second antenna ANT2 may include metal patterns 1211a2, 1211b2, 1212a2, 1212b2 and a second feeding pattern 1220-2 disposed above the substrate in a symmetrical form with respect to the center line of the first antenna ANT1. Accordingly, the second antenna ANT2 may radiate a second signal through the second feeding pattern 1220-2 and the metal patterns 1211a2, 1211b2, 1212a2, and 1212b2. The second feeding pattern 1220-2 may be disposed to be offset upward from the center line of the substrate. The feeding pattern 1220-1 may be disposed to be offset downward from the center line of the substrate. This can decrease interference between the first antenna ANT1 and the second antenna ANT2, so as to reduce an electric coupling coefficient (ECC) level during a MIMO operation.

The transceiver circuit 1250 may be connected to the feeding pattern 1220-1 and the second feeding pattern 1220-2 to radiate at least one of the first signal and the second signal. Here, the first signal and the second signal may be regarded as signals of the same band for MIMO. The first signal and the second signal may be 5G Sub 6 band signals, but may not be limited thereto. Accordingly, the transceiver circuit 1250 can radiate at least one of the first signal and the second signal through one of the first antenna ANT1 and the second antenna ANT2. As illustrated in FIG. 3B, when two antennas are arranged adjacent to each other to perform MIMO, this may be referred to as a 1×2 MIMO antenna.

The 1×2 MIMO antenna may include a plurality of vias in order to reduce an antenna size and mutual interference. In this regard, the first antenna ANT1 may further include a plurality of vias configured to connect the first and second metal patterns and the lower ground pattern at an end portion of the substrate. Also, the second antenna ANT2 may further include a plurality of vias configured to connect the first and second metal patterns and the lower ground pattern at the end portion of the substrate.

In this regard, as illustrated in FIG. 3B, the plurality of vias may be disposed only in a boundary region between the first antenna ANT1 and the second antenna ANT2. Alternatively, the plurality of vias may be disposed only at the end portion where the first antenna ANT1 and the second antenna ANT2 are disposed. Alternatively, the plurality of vias may be disposed both at the end portion of the substrate where the first antenna ANT1 and the second antenna ANT2 are disposed and the boundary region between the first antenna ANT1 and the second antenna ANT2.

Meanwhile, referring to FIGS. 3A and 3B, the metal pattern of the first antenna ANT1 and the metal pattern of the second antenna ANT2 may be disposed on an upper portion of the first substrate S1. In addition, the first antenna ANT1 and the second antenna ANT2 may be disposed in a symmetrical form with respect to a first center line of the first substrate S1. That is, the first antenna ANT1 and the second antenna ANT2 may be adjacently disposed at a left side and a right side of the first substrate S1.

Alternatively, the first antenna ANT1 and the second antenna ANT2 may be disposed in an upper and lower symmetric form with respect to a second center line perpendicular to the first center line. That is, the second antenna ANT2 may be disposed adjacent to the first antenna ANT1 in a state of being rotated by 180 degrees with respect to the first antenna ANT1.

Meanwhile, in the 1×2 MIMO antenna, the second substrate S2 may be disposed under the first substrate S1. In addition, a ground layer may further be disposed on a lower portion of the second substrate S2 to provide a reference electric potential for the first and second antennas ANT1 and ANT2.

Meanwhile, the first antenna ANT1 and the second antenna ANT2 may include first radiation portions 1211a, 1212a, 1211a2, 1212a2 and second radiation portions 1211b, 1212b, 1211b2, 1212b2. Here, the first radiation portion 1211a, 1212a, 1211a2, 1212a2 may be formed in a rectangular shape having a predetermined length and width, and may have the inset region therein. In addition, the second radiation portion 1211b, 1212b, 1211b2, 1212b2 may be connected to the first radiation portion and tapered at a predetermined angle to increase its width.

Meanwhile, a coupling amount of signals from the feeding patterns 1220-1 and 1220-2 to the first radiation portions may increase and an electrical length by the first antenna and the second antenna may increase. To this end, a width of the first radiation portion may be wider than a width of the second radiation portion at a point where the first radiation portion and the second radiation portion are connected.

The feeding pattern 1220-1 and the second feeding pattern 1220-2 may be disposed in the inset regions inside the first radiation portions. In this case, the position at which the feeding pattern 1220-1 is disposed may be offset by a predetermined distance from the lower end in a width direction of the first radiation portion. On the other hand, the position at which the second feeding pattern 1220-2 is disposed may be offset by a predetermined distance from the upper end in the width direction of the first radiation portion. In this way, isolation characteristics of the first and second antennas ANT1 and ANT2 can be improved by the feeding patterns 1220-1 and 1220-2 arranged in a vertical symmetric form in the 1×2 MIMO antenna having a predetermined area.

In relation to the size reduction of the antenna module, the second radiation portion 1212b of the first antenna ANT1 and the second radiation portion 1211b2 of the second antenna ANT2 may be connected to each other. An overall size of the antenna module can be reduced by the second radiation portions 1212b and 1211b2 connected to each other.

With the aforementioned structure, a low-profile antenna that has high antenna space utilization and arrangement freedom while optimizing wireless performance can be provided.

In particular, the low-profile antenna can be effectively designed to have a very low height of 0.02λ, or lower, and can easily implement impedance matching.

In particular, the low-profile antenna may have a radiator with both end portions shorted, which can be advantageous in view of arranging plural antennas by virtue of miniaturization of antennas and improvement of isolation between antennas.

As described above, the present disclosure relates to a modification according to the design and arrangement of the low-profile type ultra-miniaturized antenna. To this end, in the antenna of the present disclosure, two metal patterns each having one end portion shorted may be disposed to face each other at a distance therebetween, indirect coupling feeding may be made between the metal patterns, and one antenna or a plurality of antennas may be arranged in series or both in series and in parallel. In this case, when each antenna element is rotated, a shorting pin of a pattern placed in the center may be used in common. This common shorting pattern can serve as a radiator of each antenna while providing a de-coupling effect, thereby improving antenna isolation (S21 and ECC).

On the other hand, the first metal pattern 1211 and the second metal pattern 1212, which are the antenna patterns according to the present disclosure, may be designed in various shapes such as a triangle, a square (or rectangle), and a circle, but the biggest feature may be that the shorted arms ① and ② are spaced apart from each other and a resonance frequency and a bandwidth vary depending on the shape. A length from the terminated portion of the pattern to a shorted point by a contact pin may have the greatest influence on the antenna resonant frequency. On the other hand, as an antenna area is increased, the resonance frequency may be lowered and the bandwidth may be widened. A distance between the two antenna patterns may affect impedance, and a coupling amount may be adjusted according to the length and distance between the two antenna patterns facing each other.

Figure 4A:
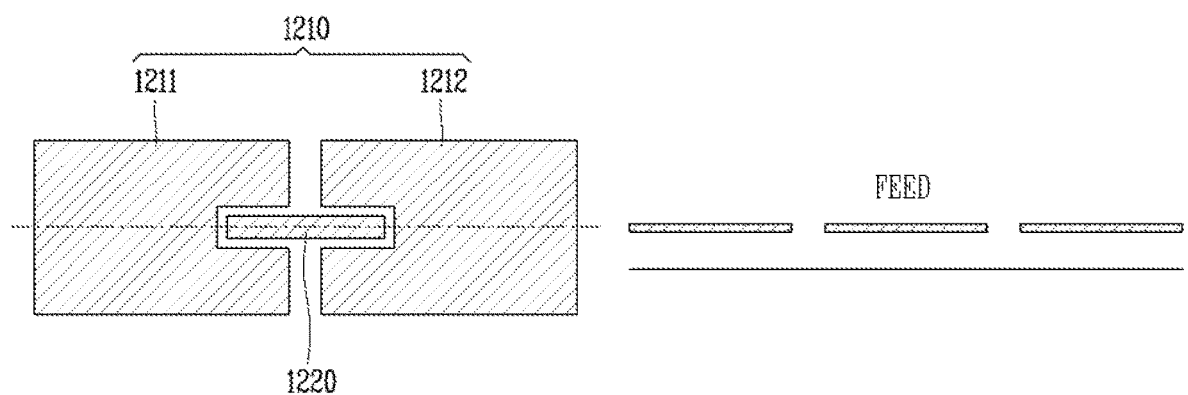
FIG. 4A is a view illustrating a structure in which a feeding pattern is disposed on the same plane with a metal pattern that is a radiator.
Figure 4B:
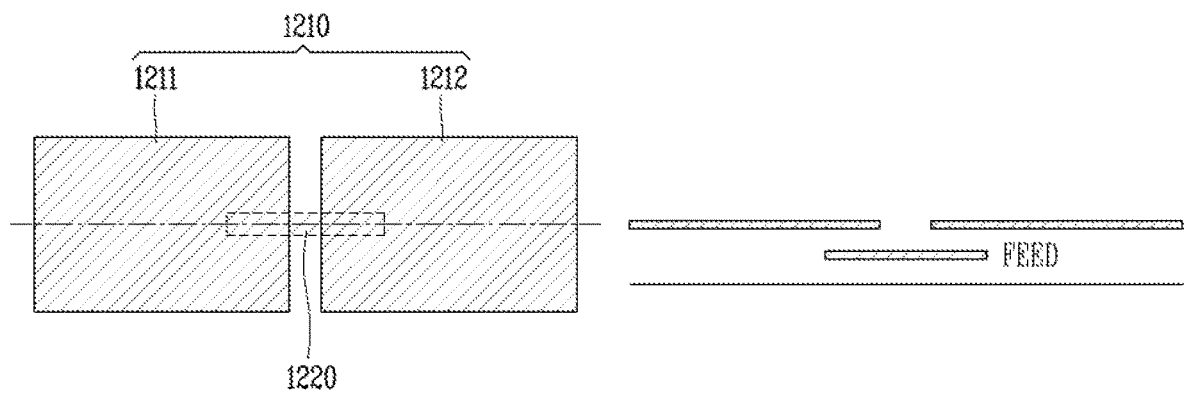
FIG. 4B is a view illustrating a structure in which the feeding pattern is disposed on a different plane from the metal pattern that is the radiator.

Meanwhile, feeding of the antenna 1200 may be carried out on the same plane as or a different plane from the metal pattern that is the radiator. FIG. 4A is a view illustrating a structure in which a feeding pattern is disposed on the same plane with a metal pattern that is a radiator. FIG. 4B is a view illustrating a structure in which the feeding pattern is disposed on a different plane from the metal pattern that is the radiator.

The antenna feeding method may be indirect feeding, and may be configured to allow feeding by arranging the feeding pattern on the same layer as the antenna pattern with a gap therebetween as illustrated in FIG. 4A or by arranging the feeding pattern on a different layer from the antenna pattern as illustrated in FIG. 4B. In this regard, impedance may vary depending on the distance between the feeding pattern and the metal pattern and the length and position of the feeding pattern as well as the distance between the two metal patterns. Accordingly, the impedance of the antenna can be adjusted by the antenna structure having a low height.

The first and second metal patterns 1211 and 1222, which are the antenna patterns made of a metal component, may be disposed on one or more dielectrics. Such a dielectric may be disposed between the first and second metal patterns 1211 and 1222 and a ground layer. The performance and size of the antenna can be adjusted when two or more dielectrics are used rather than one dielectric.

The first substrate S1 as the upper substrate and the second substrate S2 as the lower substrate that correspond to the dielectrics may be implemented in the same form as a flexible substrate. Accordingly, the low-profile antenna 1200 that is implemented on the flexible substrate can be disposed inside the electronic device. For example, the low-profile antenna 1200 that is implemented on the flexible substrate can be disposed on a carrier inside the electronic device.

As described above, the first metal pattern and the second metal pattern may be disposed on the upper portion of the first substrate S1 as the upper substrate. Meanwhile, the antenna 1200 may further include a ground layer disposed on the lower portion of the second substrate S2, which is the lower substrate, to provide a reference electric potential for the antenna 1200.

On the other hand, antenna characteristics may appear differently depending on the dielectric material between the metal patterns 1211 and 1212 and the ground. High permittivity may be advantageous in miniaturizing the antenna, and a small dielectric loss can secure better efficiency characteristics. Accordingly, the antenna performance can be optimized by varying each thickness and material (i.e., permittivity) of the multilayered dielectrics.

In this case, the permittivity of the first substrate S1 may be set to a value greater than that of the second substrate S2, thereby increasing efficiency of the antenna 1200 while reducing the size of the antenna 1200. In this regard, when the permittivity of the first substrate S1 is high, the antenna efficiency may be somewhat decreased, but the decrease in the antenna efficiency may be somewhat alleviated by the low permittivity of the second substrate S2. Accordingly, the antenna size can be reduced by setting the permittivity of the substrate S1 to a greater value. In addition, the antenna efficiency which is a little bit reduced by the permittivity of the first substrate S1 can be alleviated by the low permittivity of the second substrate S2.

Figure 5A:
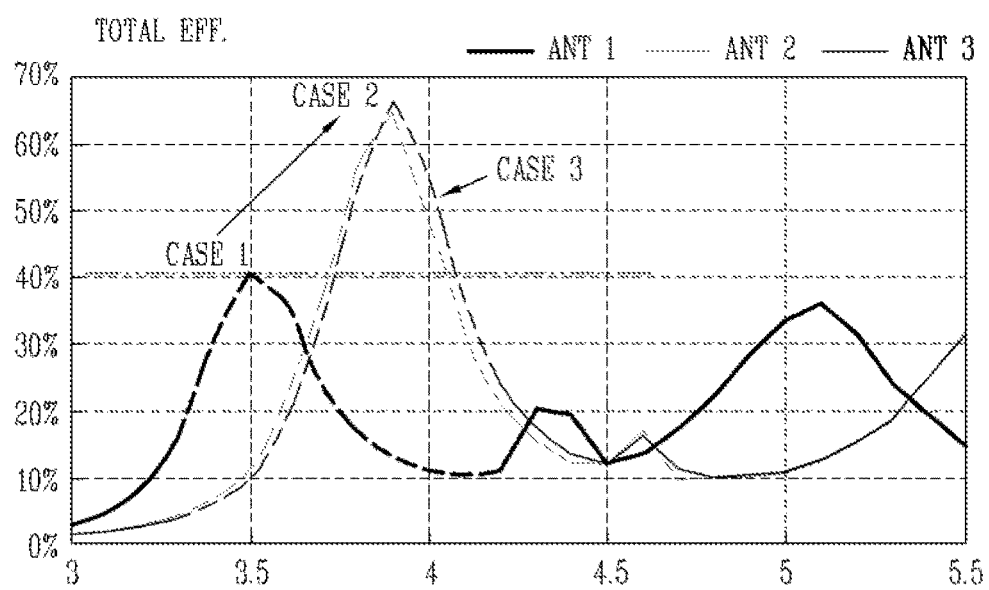
FIG. 5A is a view illustrating radiation efficiency according to a frequency change when a different dielectric is used in a low-profile antenna of a multilayered substrate structure.

FIG. 5A is a view illustrating radiation efficiency according to a frequency change when a different dielectric is used in a low-profile antenna of a multilayered substrate structure. Referring to FIG. 5A, it can be seen that as the permittivity decreases, the resonance frequency increases and the radiation efficiency increases. For example, when a substrate material is changed from an FR 4 substrate to a Teflon substrate, the resonance frequency may increase and the radiation efficiency may be improved. In this case, it was assumed that the FR 4 substrate had permittivity (Dk) of 4.5 and a dielectric loss of 0.015, and the Teflon substrate has permittivity of 3.0 and a dielectric loss of 0.0014. Here, Case 1 is a case in which both the first substrate and the second substrate are the FR 4 substrates. On the other hand, Case 2 is a case in which the first substrate is the Teflon substrate and the second substrate is the FR 4 substrate. In Case 2, since the first substrate has the low permittivity, the radiation efficiency of the antenna can increase.

In addition, Case 3 is a case in which both the first and second substrates are the Teflon substrates. Comparing Case 2 and Case 3, since the antenna radiation efficiency is greatly affected by the permittivity of the first substrate, which is the upper substrate, the radiation efficiency is almost the same. Accordingly, in the low-profile antenna of the present disclosure, the permittivity of the first substrate and the permittivity of the second substrate can be made different from each other, thereby optimizing other antenna characteristics such as impedance matching while maintaining the antenna radiation efficiency characteristic.

Table 1 shows a resonance frequency, a bandwidth, and a maximum efficiency according to changes in configuration of the first substrate as the upper substrate and the second substrate as the lower substrate according to one implementation. Here, it was assumed that the thickness of the first substrate was 0.4 mm and the thickness of the second substrate was 0.6 mm, but the present disclosure may not be limited thereto and may be variously changed depending on applications. Meanwhile, in relation to the antenna performance results of Table 1, it was assumed that the feeding pattern was disposed below the metal pattern, which is the antenna pattern, as illustrated in FIG. 4B, but the present disclosure may not be limited thereto and may be variously changed depending on applications.

TABLE 1

| Case | 1) First substrate (0.4 mm) | 2) Second substrate (0.6 mm) | Resonance frequency (f0) [GHz] | −6 dB BW | Peak Eff. [%] |
|---|---|---|---|---|---|
| 11 | FR4 | FR4 | 3.53 | 0.24 | 41.3 |
| 22 | Teflon | FR4 | 3.9 | 0.19 | 65 |
| 33 | Teflon | Teflon | 3.92 | 0.18 | 66.5 |

Referring to Table 1, when the permittivity of the first substrate is reduced, the resonance frequency increases from a 3.5 GHz band to a 3.9 GHz band. As aforementioned, the permittivity of the first substrate S1 may be set to a value greater than that of the second substrate, thereby increasing the efficiency of the antenna 1200 while reducing the size of the antenna 1200. Accordingly, the antenna size can be reduced by using the FR 4 substrate with the high permittivity for the first substrate and the antenna efficiency can be increased by using the Teflon substrate with the low permittivity for the second substrate. As another example, the second substrate may have a lower permittivity and may be implemented in the form of a foam having permittivity similar to that of air.

Meanwhile, in relation to the multilayered substrate structure, the feeding pattern 1220 may be disposed on the upper portion of the first substrate that is coplanar with the first metal pattern 1211 and the second metal pattern 1212. As another example, the feeding pattern 1220 may be disposed on the lower portion of the first substrate or the upper portion of the second substrate that is a different plane from the first metal pattern 1211 and the second metal pattern 1212. In this regard, the feeding pattern 1220 may be disposed on the lower portion of the first substrate, which is the substrate where the metal patterns 1211 and 1212 are disposed. As the feeding pattern 1220 is disposed on the lower portion of the first substrate, an alignment error between the metal patterns may be reduced compared to the case in which the feeding pattern 1220 is disposed on the upper portion of the second substrate.

As the permittivity or thickness of the dielectric increases, the resonance frequency may be lowered, which can allow the reduction of the antenna size. Also, when a dielectric having relatively high permittivity is disposed on the antenna pattern side, an antenna miniaturization effect can be obtained. In this case, when an air layer or a dielectric having a low permittivity is disposed close to the ground, the efficiency of the antenna can be improved. Although the area of the dielectric is not relevant, the dielectric loss may be reduced by thinning the feeding pattern 1220 and a slot (the gap between the metal patterns).

Even when the dielectric substrate is close to a separate wide ground layer, impedance matching can be made through the adjustment of the distances between the metal patterns 1211 and 1222 and the feeding pattern 1220, thereby enabling an operation as antennas. In this case, the antenna radiation can also be effectively performed by a horizontal magnetic field produced by the metal pattern and the contact pin.

Figure 5B:
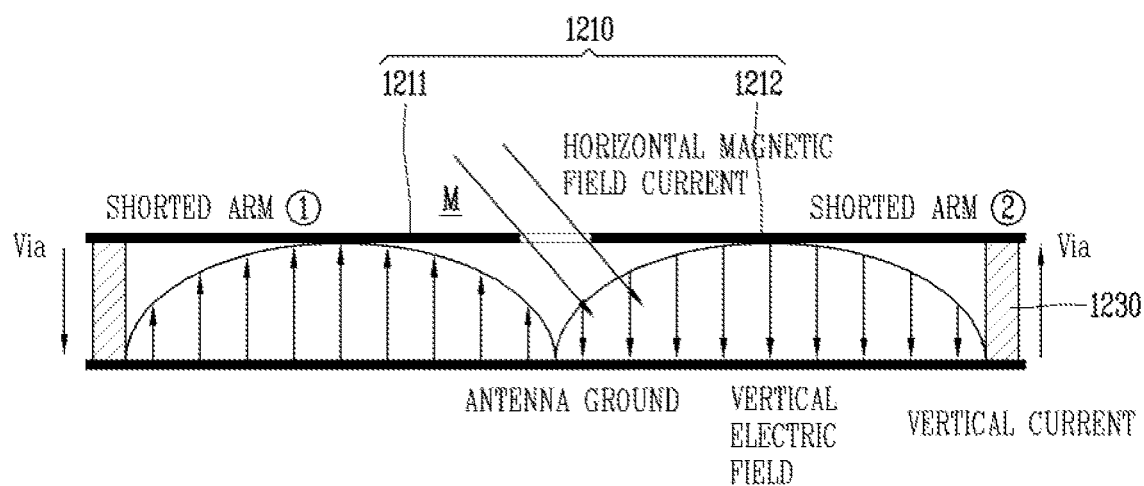
FIG. 5B is a view illustrating a principle of forming a vertical electric field and a horizontal magnetic field current in an antenna having a shorted-arm structure by vias according to the present disclosure.

FIG. 5B is a view illustrating a principle of forming a vertical electric field and a horizontal magnetic field current in an antenna having a shorted-arm structure by vias according to the present disclosure. Referring to FIGS. 3A to 5B, a vertical electric field may be generated between the first and second metal patterns 1211 and 1212 corresponding to the shorted arms and the ground layer. According to the vertical electric field, a horizontal magnetic field current may be generated on the horizontal plane with the first and second metal patterns 1211 and 1212. In particular, the horizontal magnetic field current may be generated in a boundary region of the feeding pattern 1220 and a boundary region of the inset region. The horizontal magnetic field current may allow the reduction of the height of the substrate where the antenna 1200 is disposed, thereby implementing a low-profile antenna.

As illustrated in FIG. 5B, the shorted arms may be formed by the vias, and a cavity-backed slot antenna may be implemented by the ground layer. In particular, since it is formed in an integrated structure in the form of a substrate, it may be referred to as a Substrate Integrated Waveguide (SIW) cavity-backed slot Antenna. Therefore, as the SIW cavity-backed slot antenna, the low-profile antenna can be implemented by forming cavities using the slot, the ground and the vias. Referring to the vertical electric field distribution of FIG. 5B, in the SIW cavity-backed slot antenna, a partial region of the entire antenna that generates the vertical current and the vertical electric field may be selected to be implemented as an antenna. Accordingly, the antenna 1200 can be advantageously minimized in height and antenna area.

Meanwhile, even when the size of the ground is smaller than or equal to the size of the antenna pattern, the antenna may operate as a kind of folded dipole antenna. In addition, the contact pin (shorting pin) that connects the antenna pattern and the ground can be applied in various ways. The antenna pattern and the ground may be connected through via holes formed through between dielectrics, or by using C-clips, Pogo pins, springs, fingers, or the like.

As described above, the antenna according to the present disclosure may be configured such that the two patterns (shorted arms) 1211 and 1212 each having one end shorted are disposed to face each other with the distance therebetween and fed by the feeding pattern 1220 through indirect coupling. In this case, the vertical current that flows through vertical connection portions connecting the patterns and the ground, that is, through the vias may be generated. That is, the horizontal magnetic field current may be generated by the vertical electric field generated between the metal patterns 1211 and 1212 and the ground layer. This horizontal magnetic field current may be very efficient at a low antenna height.

Figure 6A:
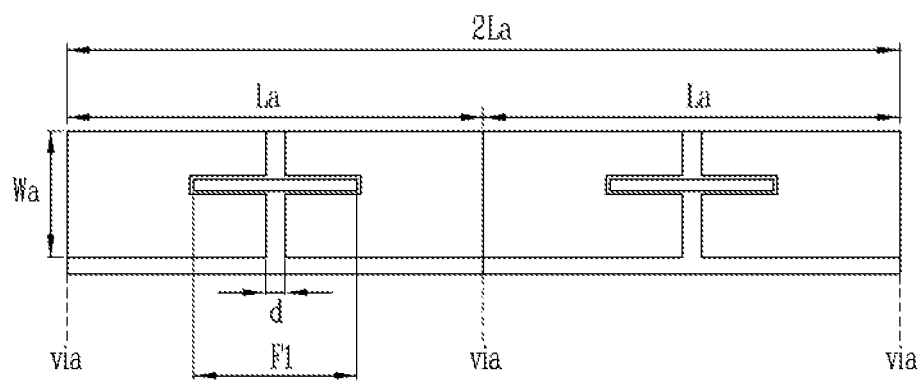
FIG. 6A is a view illustrating a structure of a 1×2 MIMO antenna and an equivalent circuit and a current flow of the 1×2 MIMO antenna according to one implementation.
Figure 6A:
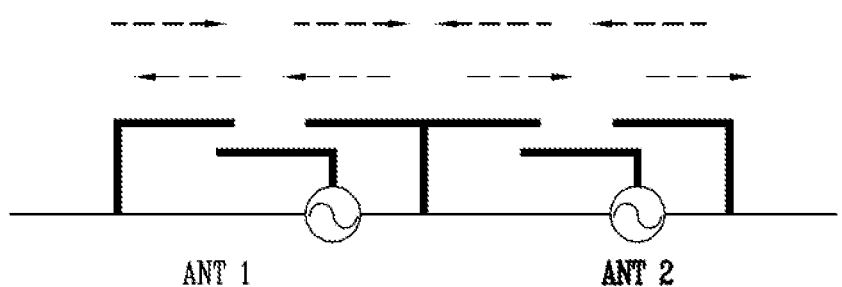

FIG. 6A is a view illustrating a structure of a 1×2 MIMO antenna and an equivalent circuit and a current flow of the 1×2 MIMO antenna according to one implementation.

Referring to FIGS. 3A and 6A, the 1×2 MIMO antenna may be configured in a structure in which two antennas are disposed adjacent to each other, and the first substrate S1 on which the antennas are disposed may have a length 2La and a width Wa. Here, the plurality of vias may be formed at both end portions and a central portion of the first substrate S1.

The plurality of vias disposed at the both end portions of the first substrate S1 may reduce the size of the antenna. In addition, the plurality of vias formed at the central portion of the first substrate S1 may reduce interference between the two antennas.

On the other hand, the feeding pattern of each antenna may have a length F1 and couple signals of the 5G Sub 6 band to the metal patterns. In addition, the metal patterns of each antenna may be spaced apart by a distance d, so as to implement the low-profile antenna by the horizontal magnetic field current generated in a region defined by the spaced distance d.

Referring to (b) of FIG. 6A, the first and second antennas ANT1 and ANT2 may be modeled by the feeding patterns disposed therein and the metal patterns surrounding the feeding patterns. In this case, the geometric structures of the feeding patterns of the first and second antennas ANT1 and ANT2 may be modeled as being formed in the same direction. Accordingly, a current generated when only the first antenna ANT1 is fed and a current generated when only the second antenna ANT2 is fed may flow in different directions from each other.

This may cause a problem that a de-coupler structure corresponding to the plurality of vias disposed between the first and second antennas ANT1 and ANT2 does not completely operate. Accordingly, when the first and second antennas ANT1 and ANT2 are disposed adjacent to each other without rotating as illustrated in FIG. 6A, interference between the antennas may increase.

Figure 6B:
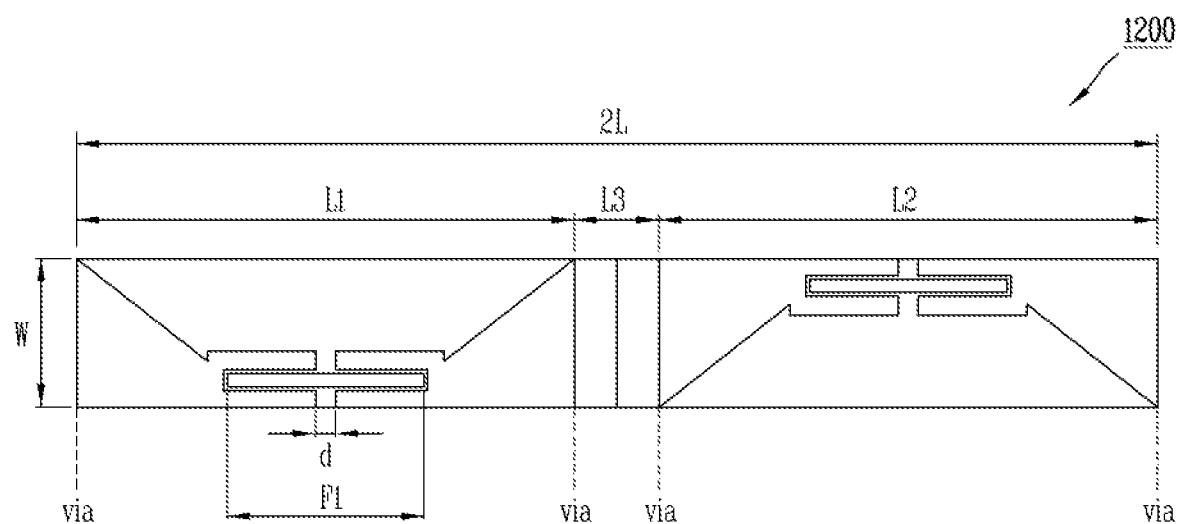
FIG. 6B is a view illustrating the structure of the 1×2 MIMO antenna and the equivalent circuit and the current flow of the 1×2 MIMO antenna.
Figure 6B:
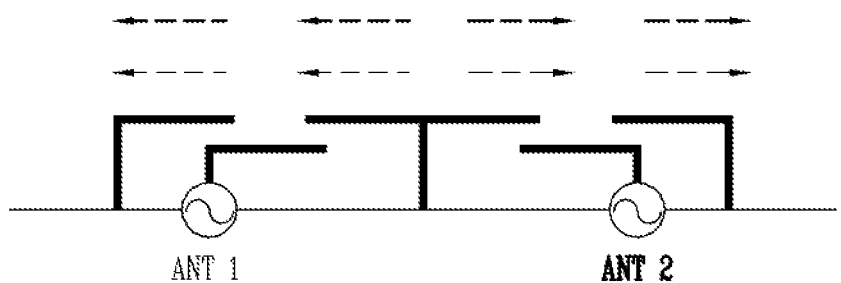

On the other hand, FIG. 6B is a view illustrating the structure of the 1×2 MIMO antenna and the equivalent circuit and the current flow of the 1×2 MIMO antenna.

Referring to FIGS. 3B and 6B, the 1×2 MIMO antenna may be configured in a structure in which two antennas are disposed adjacent to each other, and the first substrate S1 on which the antennas are disposed may have a length 2L and a width W. Here, the plurality of vias may be formed at both end portions and a central portion of the first substrate S1. The plurality of vias disposed at the both end portions of the first substrate S1 may reduce the size of the antenna. In addition, the plurality of vias formed at the central portion of the first substrate S1 may reduce interference between the two antennas.

Meanwhile, the plurality of vias may be disposed in various forms in a section in which the metal patterns of the two antennas are disposed on the entire substrate, that is, in a section having a length L3. For example, the plurality of vias may be disposed at the central portion of the section having the length L3. In another example, the plurality of vias may be disposed at both end portions of the section having the length L3. In still another example, the plurality of vias may be disposed at the both end portions and the central portion of the section having the length L3.

On the other hand, the feeding pattern of each antenna may have a length F1 and couple signals of the 5G Sub 6 band to the metal patterns. In addition, the metal patterns of each antenna may be spaced apart by a distance d, so as to implement the low-profile antenna by the horizontal magnetic field current generated in a region defined by the spaced distance d.

Referring to (b) of FIG. 6B, the first and second antennas ANT1 and ANT2 may be modeled by the feeding patterns disposed therein and the metal patterns surrounding the feeding patterns. In this case, the geometric structure of the feeding patterns of the first and second antennas ANT1 and ANT2 may be modeled in a symmetric form with respect to the vias in the boundary region between the first and second antennas ANT1 and ANT2. That is, in (b) of FIG. 6B, the feeding patterns of the first and second antennas ANT1 and ANT2 may be represented as being formed in different directions with respect to the boundary region. On the other hand, in (b) of FIG. 6A, the feeding patterns of the first and second antennas ANT1 and ANT2 may be represented as being formed in the same direction with respect to the boundary region.

Accordingly, referring to (b) of FIG. 6B, a current generated when only the first antenna ANT1 is fed and a current generated when only the second antenna ANT2 is fed may flow in the same direction.

This can allow the de-coupler structure corresponding to the plurality of vias disposed between the first and second antennas ANT1 and ANT2 to ideally and completely operate. Accordingly, as illustrated in FIG. 6B, when the first and second antennas ANT1 and ANT2 are disposed in the vertical symmetric form by 180-degree rotation, the interference between the antennas can be reduced.

Figure 7A:
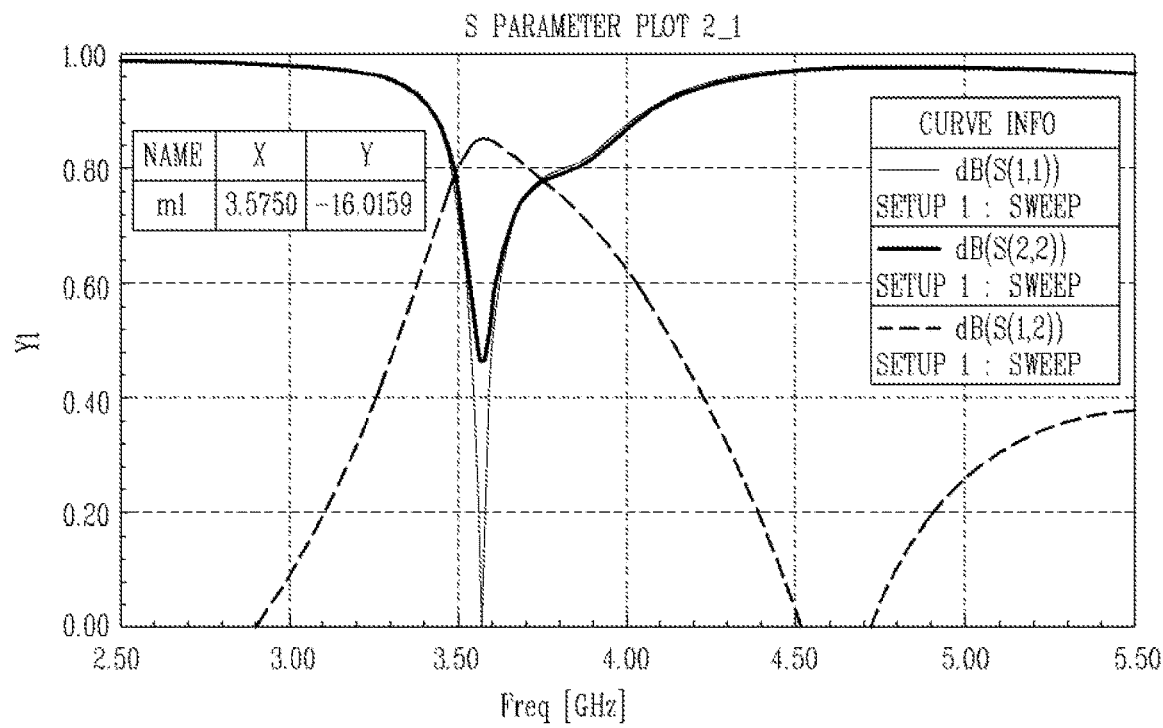
FIGS. 7A to 7C are views illustrating return loss, efficiency, and ECC levels in the 1×2 MIMO antenna structure of FIG. 6A.
Figure 7B:
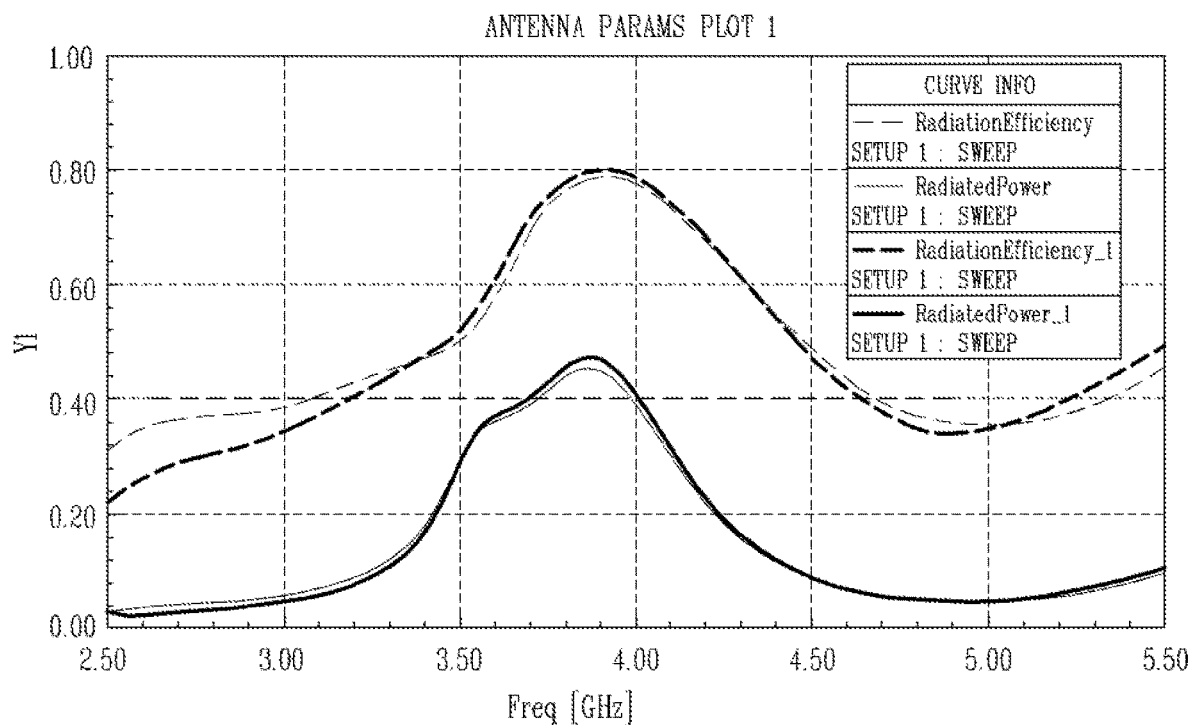
Figure 7C:
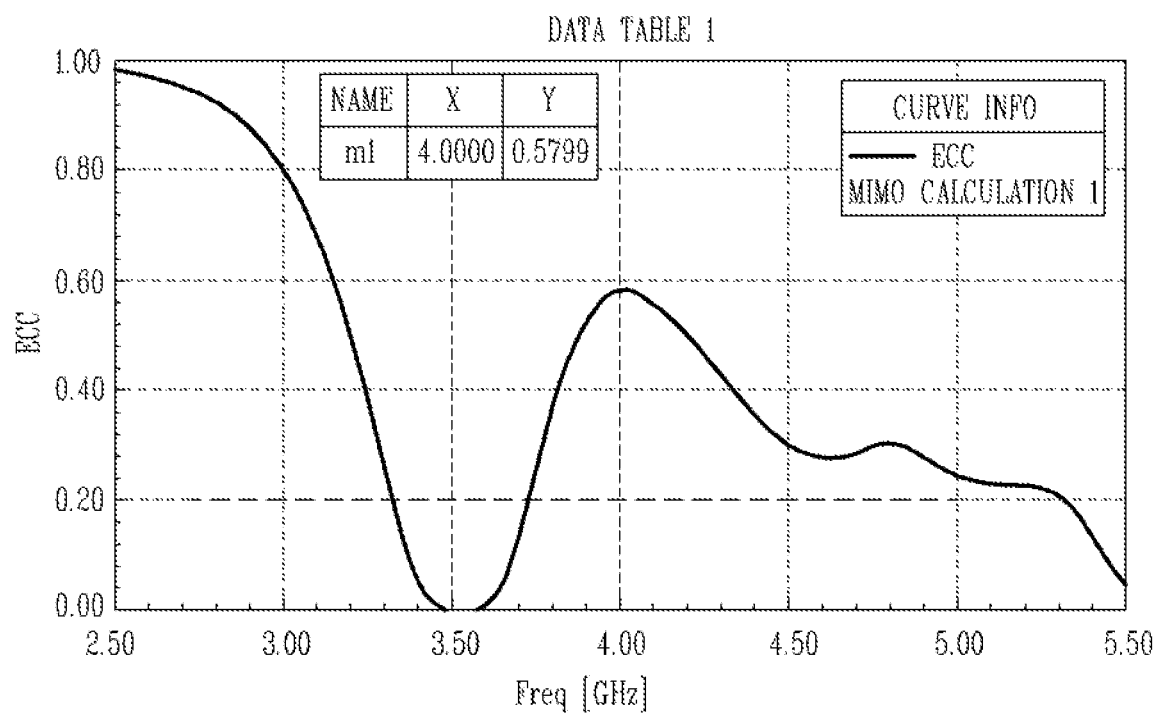

FIGS. 7A to 7C show return loss, efficiency, and ECC levels in the 1×2 MIMO antenna structure of FIG. 6A.

Referring to FIG. 7A, in the 1×2 MIMO antenna structure of FIG. 6A, an interference level S12 between the first and second antennas ANT1 and ANT2 may have a value of −6 dB or more in an operating band. Accordingly, referring to FIG. 7C, in the 1×2 MIMO antenna structure of FIG. 6A, an ECC level between the first and second antennas ANT1 and ANT2 may have a value of 0.2 or more, for example, about 0.6 in the operating band.

On the other hand, referring to FIG. 7B, in the 1×2 MIMO antenna structure of FIG. 6A, efficiency may be 40% or more in the operating band. However, as the interference level S12 increases in several frequency bands of the operating band as illustrated in FIG. 7A, the efficiency may slightly decrease in such several frequency bands as illustrated in FIG. 7B. Accordingly, referring to FIG. 7B, it can be seen that the graph is asymmetric in the left and right directions as the efficiency characteristic is reduced due to the increase in the interference level S12.

Figure 8A:
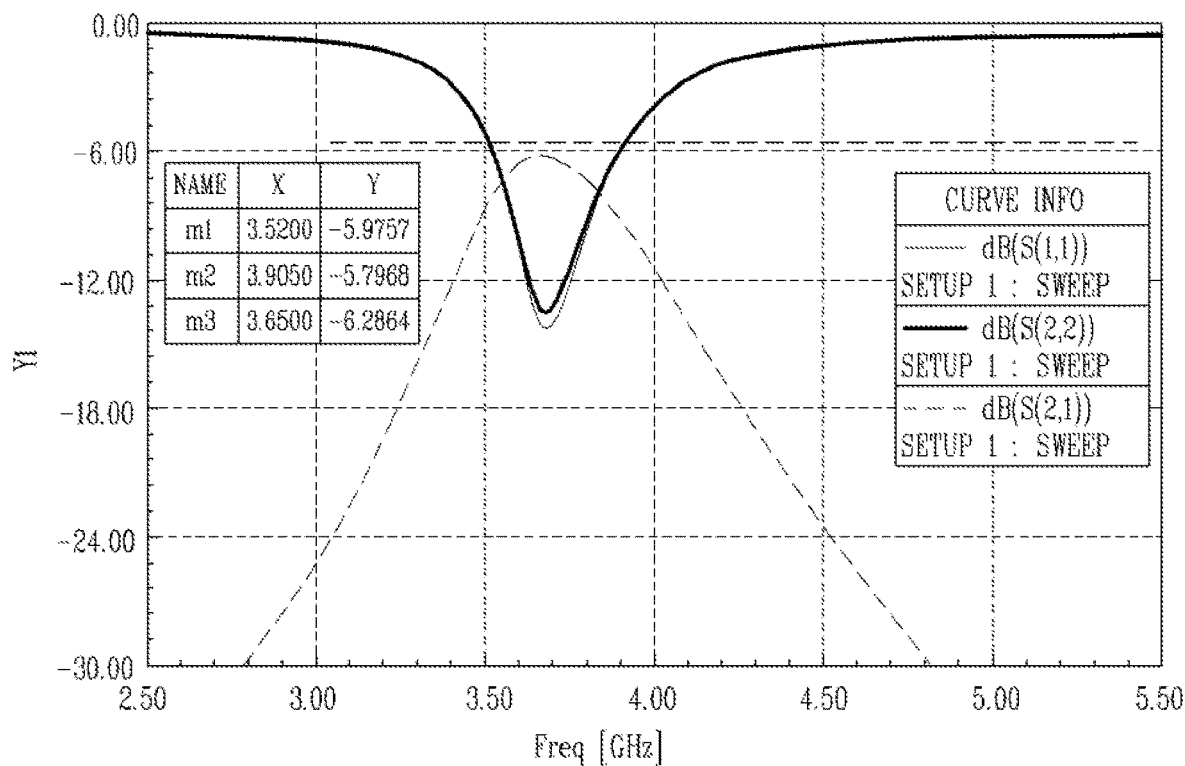
FIGS. 8A to 8C are views illustrating return loss, efficiency, and ECC levels in the 1×2 MIMO antenna structure of an upper and lower symmetric structure as illustrated in FIG. 6B.
Figure 8B:
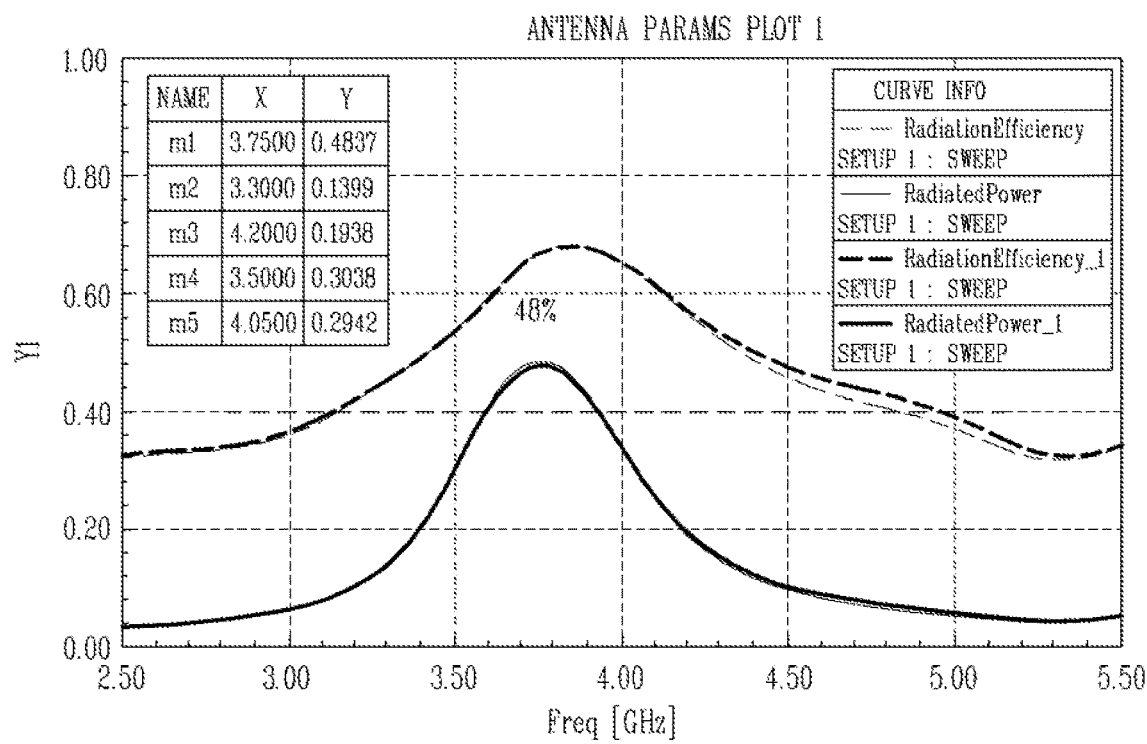
Figure 8C:
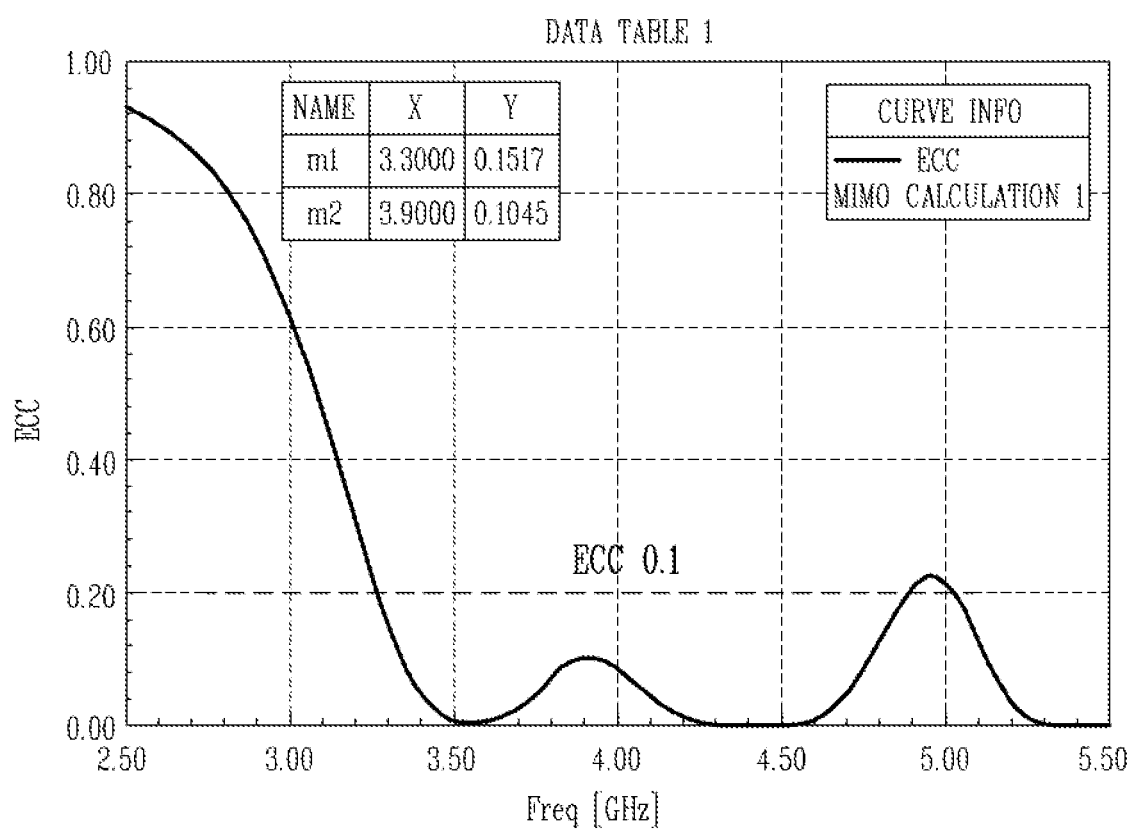

FIGS. 8A to 8C are views illustrating return loss, efficiency, and ECC levels in the 1×2 MIMO antenna structure of an upper and lower symmetric structure as illustrated in FIG. 6B.

Referring to FIG. 8A, in the 1×2 MIMO antenna structure of FIG. 6B, the interference level S12 between the first and second antennas ANT1 and ANT2 may have a value of −6 dB or less in the operating band. Accordingly, referring to FIG. 8C, in the 1×2 MIMO antenna structure of FIG. 6B, the ECC level between the first and second antennas ANT1 and ANT2 may have a value of 0.2 or less, for example, up to about 0.1 in the operating band.

On the other hand, referring to FIG. 8B, in the 1×2 MIMO antenna structure of FIG. 6B, the efficiency may be 40% or more in the operating band. In addition, as illustrated in FIG. 8A, the interference level S12 can have a value smaller than or equal to a threshold in the full operating band, so that the stable efficiency characteristic can be obtained in the full operating band as illustrated in FIG. 8B. Accordingly, referring to FIG. 8B, it can be seen that the graph is symmetric in the left and right directions as the efficiency characteristic is improved according to the decrease in the interference level S12.

Figure 9A:
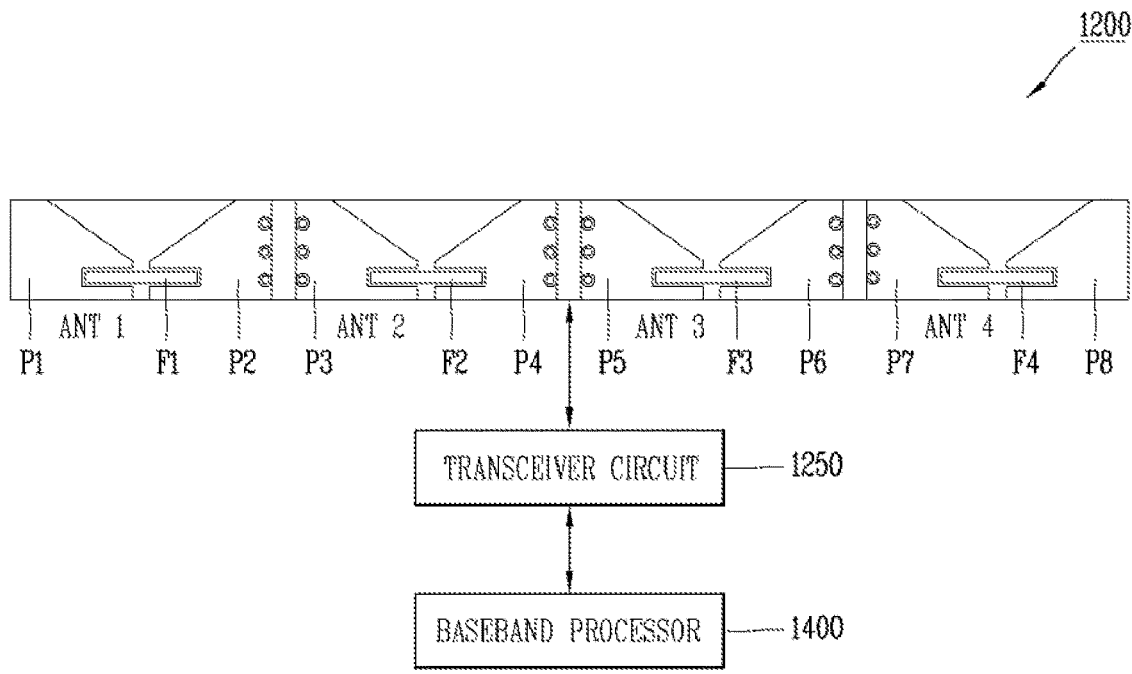
FIG. 9A is a view illustrating a configuration of a 1×4 MIMO antenna in accordance with one implementation.

Meanwhile, the 1×2 MIMO antenna according to the present disclosure may be expanded to a 1×4 MIMO antenna. FIG. 9A is a view illustrating a configuration of a 1×4 MIMO antenna in accordance with one implementation.

Figure 9B:
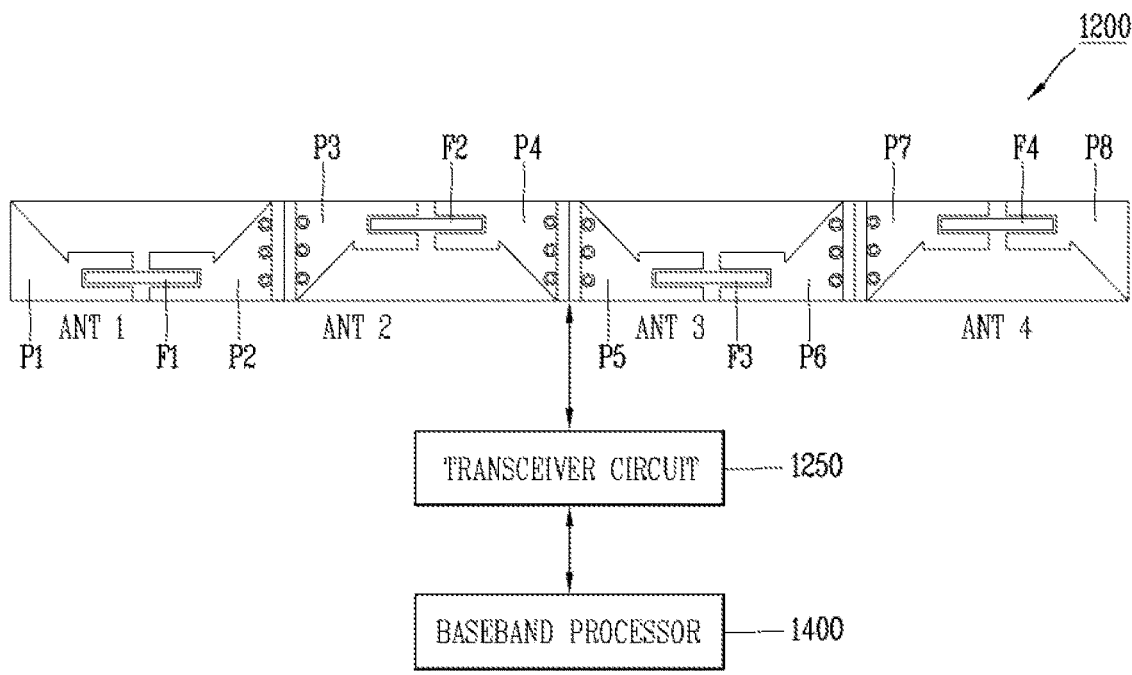
FIG. 9B is a view illustrating a configuration of a 1×4 MIMO antenna in accordance with another implementation.

FIG. 9B is a view illustrating a configuration of a 1×4 MIMO antenna in accordance with another implementation.

In this regard, FIG. 9A illustrates a structure in which antenna elements of the same type are disposed adjacent to one another to be expanded to a 1×4 MIMO antenna. On the other hand, FIG. 9B illustrates a structure in which vertical symmetric antenna elements are disposed adjacent to each other to be expanded to a 1×4 MIMO antenna.

Referring to FIGS. 9A and 9B, the second antenna ANT2 may be disposed adjacent to the first antenna ANT1 on the upper portion of the substrate. Meanwhile, the 1×4 MIMO antenna may further include a third antenna ANT3 and a fourth antenna ANT4 in addition to the first antenna ANT1 and the second antenna ANT2.

Specifically, the third antenna ANT3 may be disposed adjacent to the second antenna ANT2 on the upper portion of the substrate, and configured to radiate a third signal through metal patterns P5 and P6 and a third feeding pattern F3. Also, the fourth antenna ANT4 may be disposed adjacent to the third antenna ANT3 on the upper portion of the substrate, and configured to radiate a fourth signal through metal patterns P7 and P8 and a fourth feeding pattern F4.

Accordingly, at least one of the first to fourth signals may be transmitted or received through the first to fourth antennas ANT1 to ANT4. In this case, the baseband processor 1400 may perform UL MIMO to transmit two or more signals simultaneously in the same band. Also, the baseband processor 1400 may perform DL MIMO to receive two or more signals simultaneously in the same band.

In the 1×4 MIMO antenna as illustrated in FIG. 9A, in order to reduce the interference level between adjacent antennas, radiation portions of the adjacent antennas may be separated by a dielectric. To this end, the second radiation portion P2 of the first antenna ANT1 and the second radiation portion P3 of the second antenna ANT2 may be separated from each other by a dielectric region of the substrate. Here, the second radiation portions P2 and P3 of the first and second antennas ANT1 and ANT2 may correspond to metal patterns having a width increasing in a tapered shape. In this way, the second radiation portion of the first antenna ANT1 and the second radiation portion of the second antenna ANT2 may be separated from each other, so as to reduce the interference between the first antenna ANT1 and the second antenna ANT2.

Also, a plurality of vias may be formed in the 1×4 MIMO antenna as illustrated in FIG. 9A. In this regard, the first to fourth antennas ANT1 to ANT4 may further include a plurality of vias configured to connect the first and second metal patterns and the lower ground pattern at an end portion of the substrate. For example, the plurality of vias may be formed in the metal patterns P2 to P7 of the adjacent antennas that are separated from each other by the dielectric region of the substrate. Therefore, the plurality of vias may be formed in the metal patterns P2 to P7 of the adjacent antennas in order to improve isolation between the antennas rather than miniaturizing the antennas.

As another example, the plurality of vias may be formed in all the metal patterns P1 to P8 of the antennas in order to miniaturize the antennas and improve the isolation between the antennas.

Meanwhile, the plurality of vias may be formed in a similar manner in the 1×4 MIMO antenna as illustrated in FIG. 9B. In this regard, the first to fourth antennas ANT1 to ANT4 may further include a plurality of vias configured to connect the first and second metal patterns and the lower ground pattern at an end portion of the substrate. For example, the plurality of vias may be formed in the metal patterns P2 to P7 of the adjacent antennas that are separated from each other by the dielectric region of the substrate. Therefore, the plurality of vias may be formed in the metal patterns P2 to P7 of the adjacent antennas in order to improve isolation between the antennas rather than miniaturizing the antennas.

As another example, the plurality of vias may be formed in all the metal patterns P1 to P8 of the antennas in order to miniaturize the antennas and improve the isolation between the antennas.

Meanwhile, in the 1×4 MIMO antenna having the vertical symmetric structure as illustrated in FIG. 9B, radiation portions of the adjacent antennas may be connected to each other in terms of reducing the overall size of the antenna. However, the present disclosure may not be limited thereto, and if the overall size of the antenna is not a problem, the radiation portions of the adjacent antennas may be separated from each other by a dielectric material as illustrated in FIG. 9A to further improve isolation.

In relation to the arrangement structure of the 1×4 MIMO antenna, a tapered bow-tie structure as illustrated in FIG. 3B has been described, but the present disclosure may not be limited thereto. Accordingly, the structure of separating adjacent radiation portions in FIG. 9A and the vertical symmetric structure in FIG. 9B may also be applied to the structure of the rectangular radiation portion as illustrated in FIG. 3A.

Figure 10A:
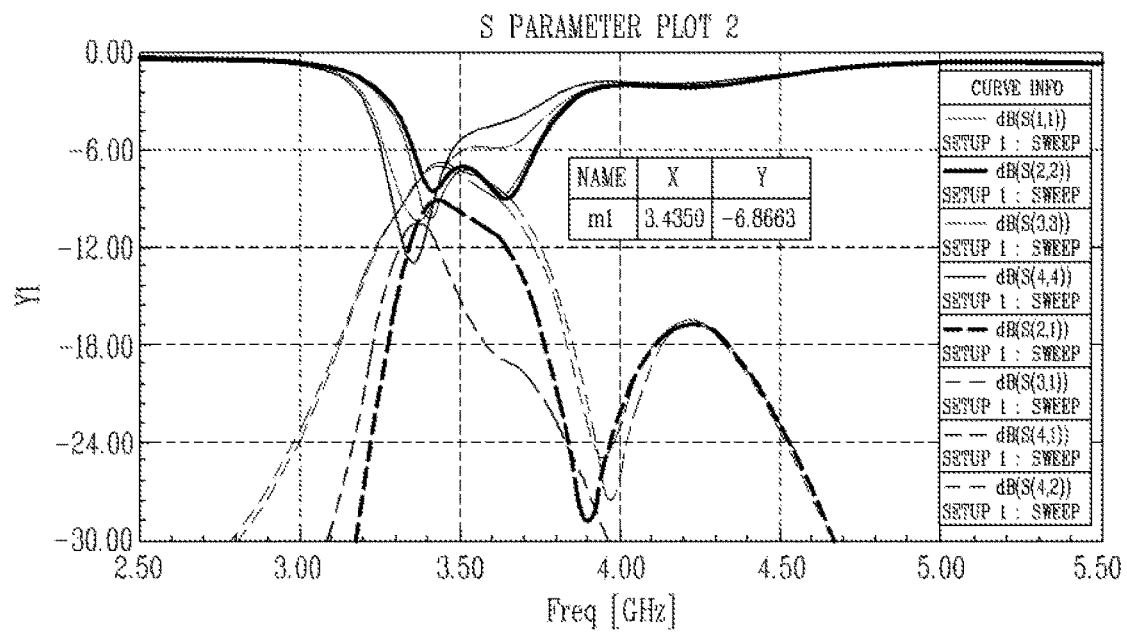
FIGS. 10A and 10B are views illustrating return loss and antenna efficiency in the 1×4 MIMO antenna of the structure separated by dielectric of FIG. 9A.
Figure 10B:
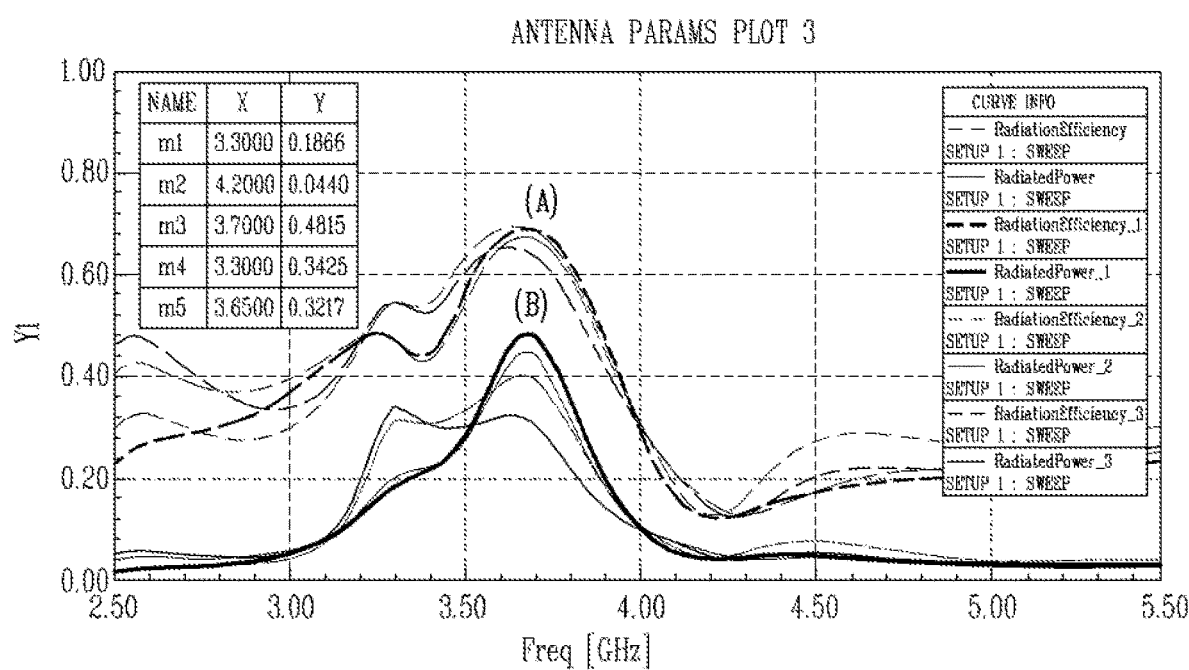

FIGS. 10A and 10B are views illustrating return loss and antenna efficiency in the 1×4 MIMO antenna of the structure separated by dielectric of FIG. 9A. Referring to FIG. 10A, since the isolation between the adjacent antennas has a value of −6 dB or less, it can be seen that the isolation of a predetermined level or less is guaranteed between the antennas. Also, referring to FIG. 10B, it can be seen that radiation efficiency (A) has a value of 60% or more in the operating band. It can also be seen that total efficiency (B) has a value of 4% or more in the operating band. Here, the total efficiency (B) means antenna efficiency considering both loss of the antenna itself and feeding loss. On the other hand, the radiation efficiency (A) means antenna efficiency considering only the loss of the antenna itself.

Therefore, in the 1×4 MIMO antenna, the vertical symmetric structure as illustrated in FIG. 9B may not be essential. Depending on an application, the 1×4 MIMO antenna may be arranged in the same shape and the radiation portions of the adjacent antenna elements may be separated from each other, thereby securing the antenna isolation. The vertical symmetric structure and/or the radiation portion separated structure may also be applied to the 1×2 MIMO antenna and any type of MIMO antenna in addition to the 1×4 MIMO antenna.

Meanwhile, the antenna module, that is, the 1×2 MIMO antenna or the 1×4 MIMO antenna may be disposed on the substrate as described above. In addition, the antenna module may be disposed to be spaced apart from the system ground on the body of the electronic device or another PCB by a predetermined distance. In this case, in view of miniaturization of the antenna, the substrate on which the antenna module is disposed may have a limited size. Accordingly, various structures for connecting the antenna module to the system ground may be considered in terms of antenna performance improvement and structural stability.

Figure 11:
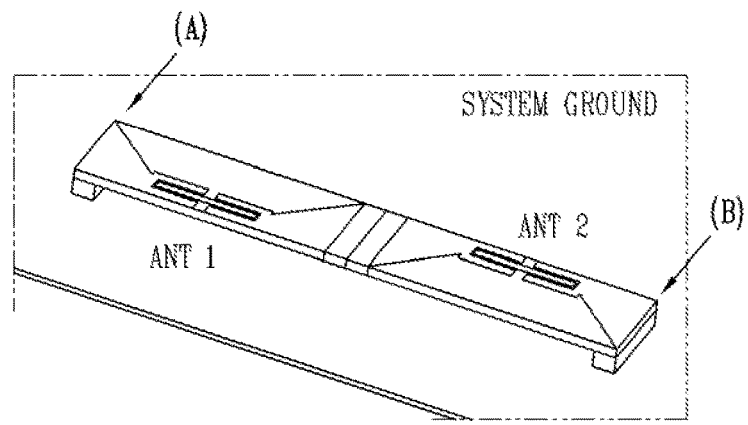
FIG. 11 is a view illustrating a connection structure between a 1×2 MIMO antenna and a system ground according to various implementations.
Figure 11:
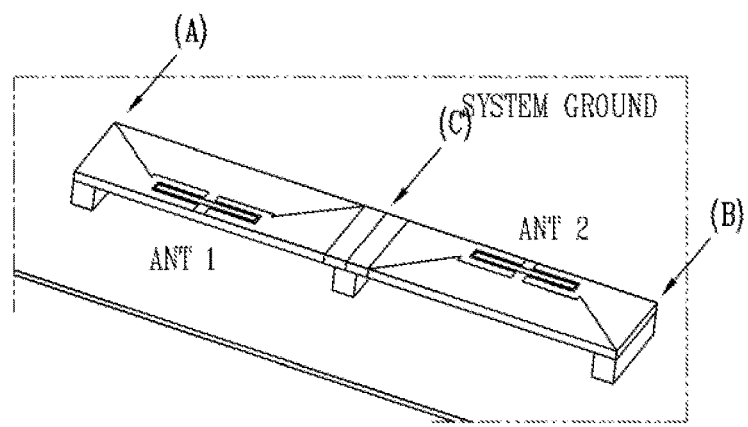
Figure 11:
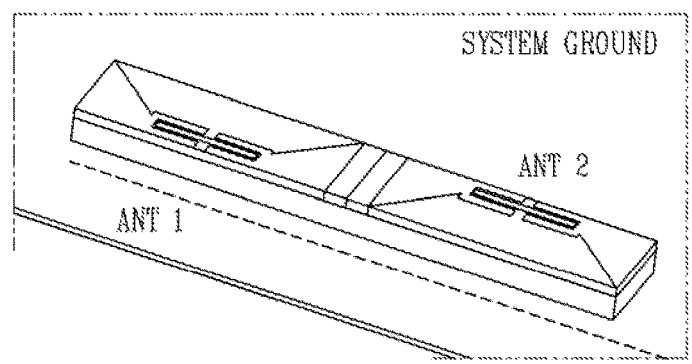

FIG. 11 is a view illustrating a connection structure between the 1×2 MIMO antenna and the system ground according to various implementations. Referring to FIGS. 3A and 11, the first antenna ANT1 and the second antenna ANT2 may include a second substrate S2 disposed under the substrate S1 in alignment with the substrate S1. In this regard, when a wide ground such as the system ground operates as the ground of the antenna module, an entire height of the antenna can be secured so as to improve antenna efficiency and bandwidth performance. However, the antenna performance may be affected by components of the lower end of the antenna disposed on the system ground or other PCB.

Referring to FIG. 3A and (a) of FIG. 11, the ground formed at the second substrate S2 may be connected to the system ground in two regions. In this case, the ground formed at the second substrate S2 may be connected to the system ground in both end regions A and B of the second substrate S2.

Referring to FIG. 3A and (b) of FIG. 11, the ground formed at the second substrate S2 may be connected to the system ground in three regions. The connection structure may not be limited to the three regions, and can be expanded to a structure connected in three or more regions. That is, the ground layer of the second substrate S2 may be connected to the system ground in three or more regions. On the other hand, when the ground layer of the second substrate S2 is connected to the system ground in three regions, the connected regions may be both end regions A and B of the second substrate S2 and a central region C of the second substrate S2.

Referring to FIG. 3A and (c) of FIG. 11, the ground formed at the second substrate S2 may be connected to the system ground in an entire region. That is, a separate ground structure having a predetermined height may be disposed so that the second substrate S2 and the system ground are electrically connected in the entire region.

Figure 12A:
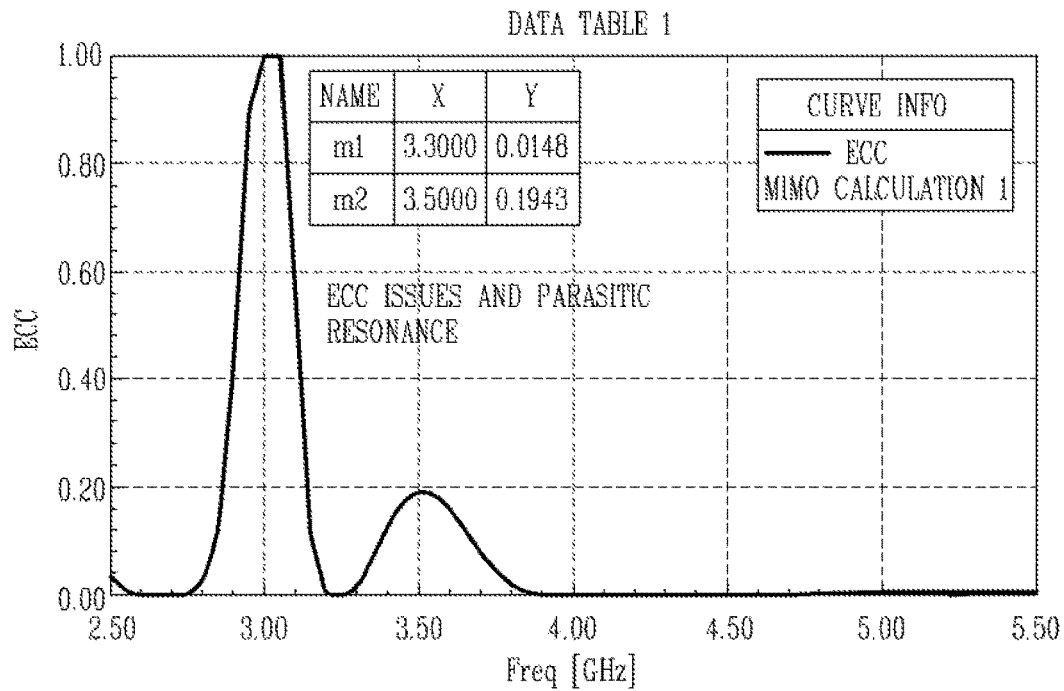
FIG. 12A is a view illustrating ECC characteristics in a structure in which a substrate ground and a system ground are connected in two regions in the 1×2 MIMO antenna.
Figure 12B:
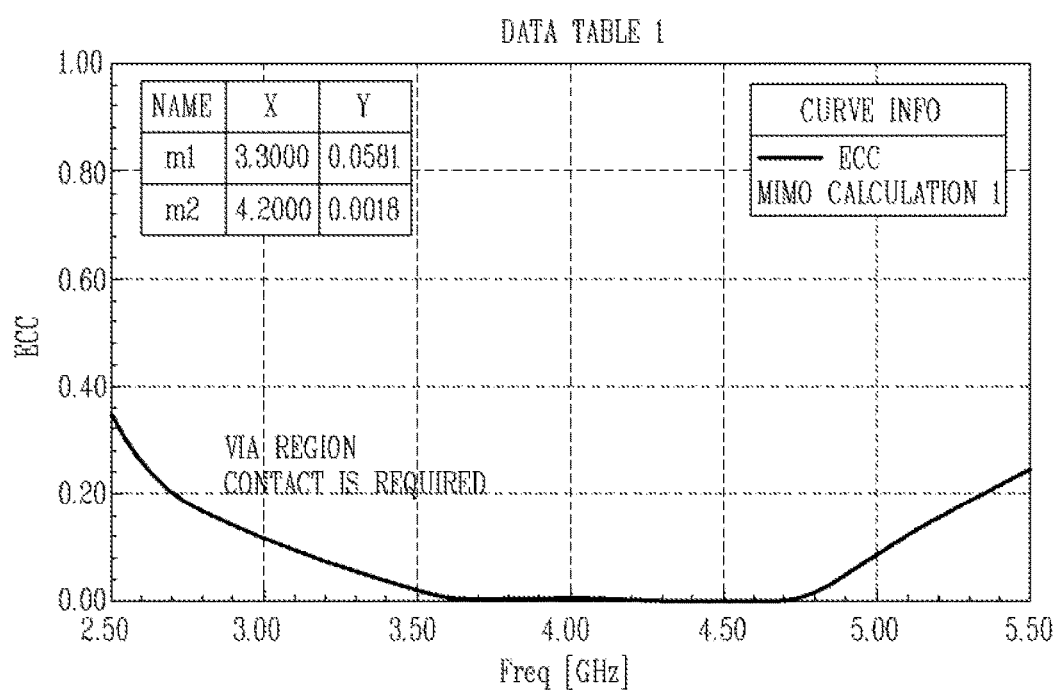
FIG. 12B is a view illustrating ECC characteristics in a structure in which a substrate ground and a system ground are connected in three regions in the 1×2 MIMO antenna.

FIG. 12A is a view illustrating ECC characteristics in a structure in which a substrate ground and a system ground are connected in two regions in the 1×2 MIMO antenna. FIG. 12B is a view illustrating ECC characteristics in a structure in which a substrate ground and a system ground are connected in three regions in the 1×2 MIMO antenna.

Referring to (a) of FIG. 11 and FIG. 12A, when the system ground is connected in both end regions of the second substrate S2, it can be seen that the ECC level is very high in a specific band. This ECC issue may be caused by parasitic resonance between the system ground and the substrate on which the first and second antennas ANT1 and ANT2 are disposed. Accordingly, in order to prevent such parasitic resonance, the system ground and the second substrate S2 need to have a connection structure with the system ground in a separate region.

Referring to (b) of FIG. 11 and FIG. 12B, when the system ground is also connected in the central region in addition to the both end regions of the second substrate S2, it can be seen that the ECC level is below the threshold in the entire band. Accordingly, the system ground needs to be connected in the central region in addition to the both end regions of the second substrate S2. In addition, the connection structure between the grounds may be premised on the plurality of vias disposed in the radiation portions of the first and second antennas ANT1 and ANT2. Accordingly, a via region contact may be required at the radiation portions of the first and second antennas ANT1 and ANT2.

Figure 13A:
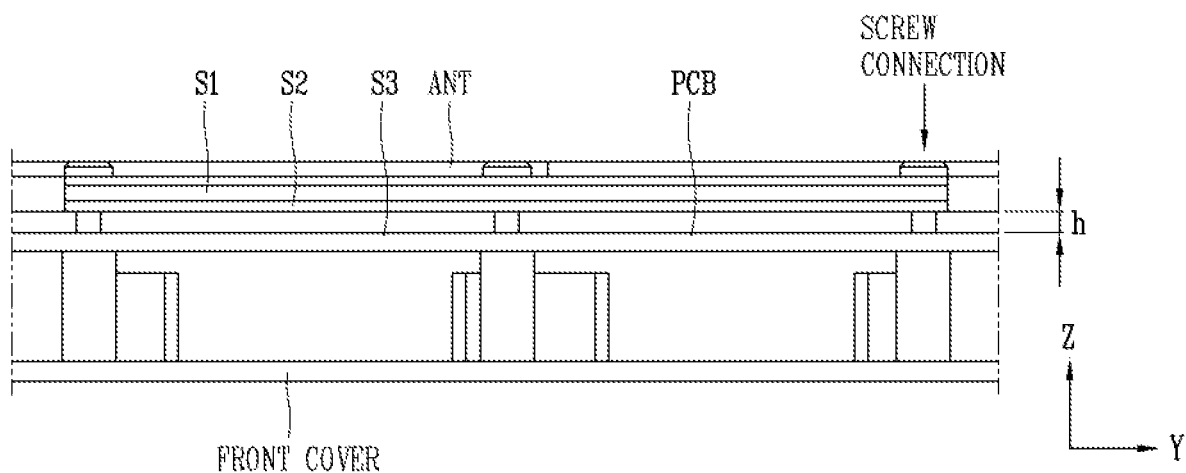
FIG. 13A is a lateral view illustrating an electronic device in which an antenna module and a PCB are disposed in parallel.
Figure 13B:
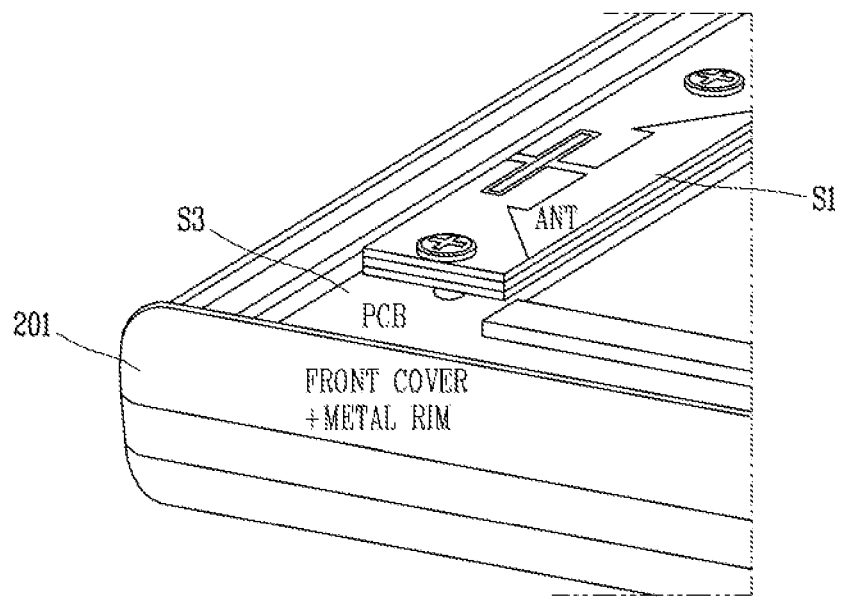
FIG. 13B is a view illustrating a structure in which the antenna module and the PCB are disposed inside an electronic device.

Meanwhile, along with the connection between the ground of the antenna module and the system ground, a factor affecting the antenna characteristics may be a height between the antenna module and the PCB. FIG. 13A is a lateral view illustrating an electronic device in which an antenna module and a PCB are disposed in parallel. FIG. 13B is a view illustrating a structure in which the antenna module and the PCB are disposed in the electronic device.

Referring to FIGS. 3A, 3B, 13A and 13B, the ground layer disposed on the lower portion of the second substrate S2 may be connected to the system ground in partial regions through a PCB S3 provided in the electronic device. In this case, the substrate on which the antenna module is disposed may be disposed substantially parallel to the PCB S3 and may be connected to the system ground of the front cover through screws. In this regard, the transceiver circuit 1250 corresponding to the RFIC and the baseband processor 1400 corresponding to the modem may be disposed on the PCB S3.

In this regard, the front cover and metal rims 201 on the side surfaces of the electronic device may be integrally formed to operate as a system ground. In addition, the ground layer may be spaced apart from the system ground by a distance h in the remaining region except for the partial regions, thereby increasing the bandwidths of the first and second antennas ANT1 and ANT2.

So far, the antenna module operating in the 5G Sub 6 band has been described. Hereinafter, an antenna operation control method through an antenna module operating in a 5G Sub 6 band and an antenna operating in a different band will be described.

Figure 14:
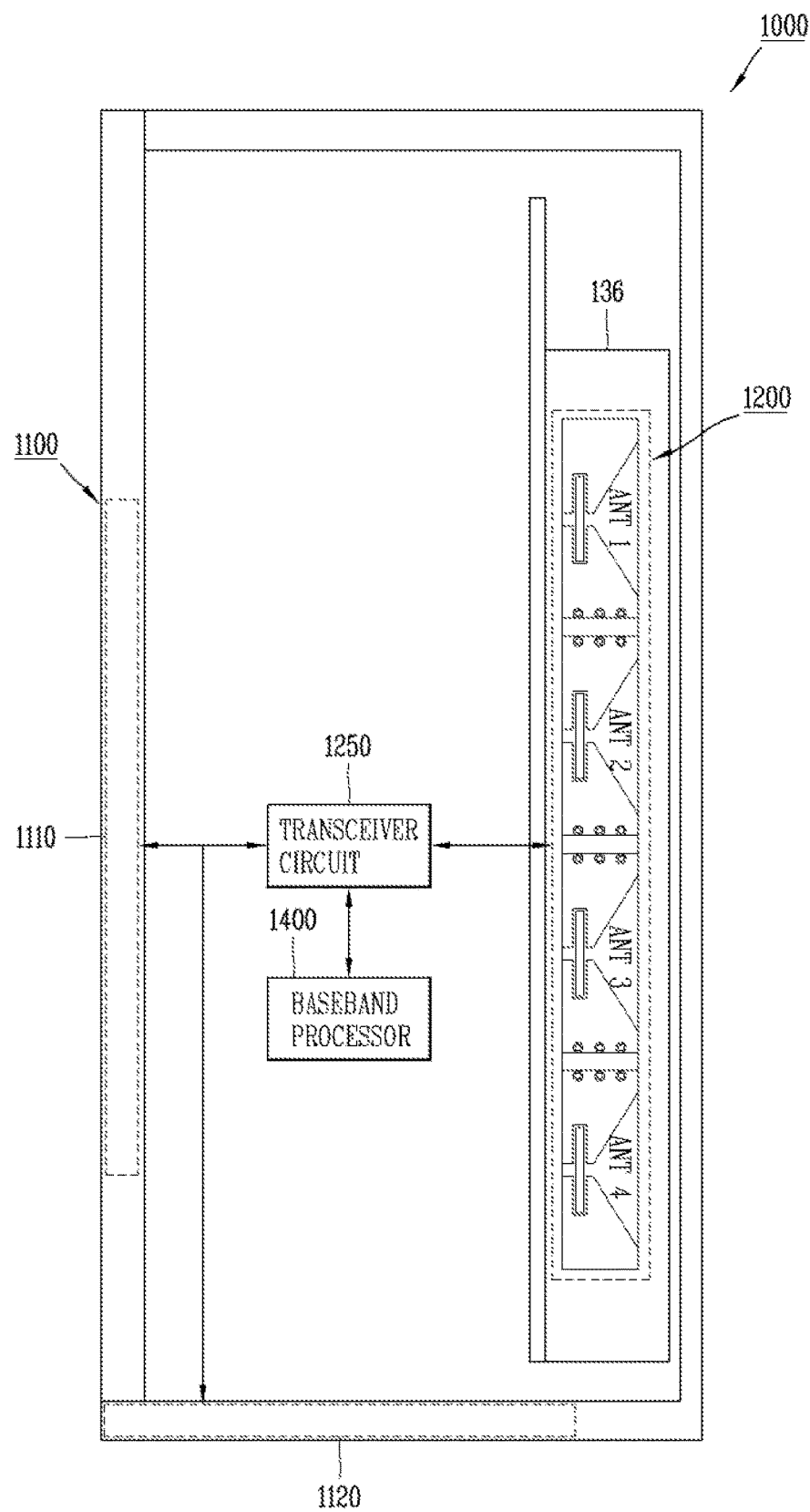
FIG. 14 is a view illustrating a configuration that a baseband processor controls a plurality of antenna modules in accordance with one implementation.
Figure 15:
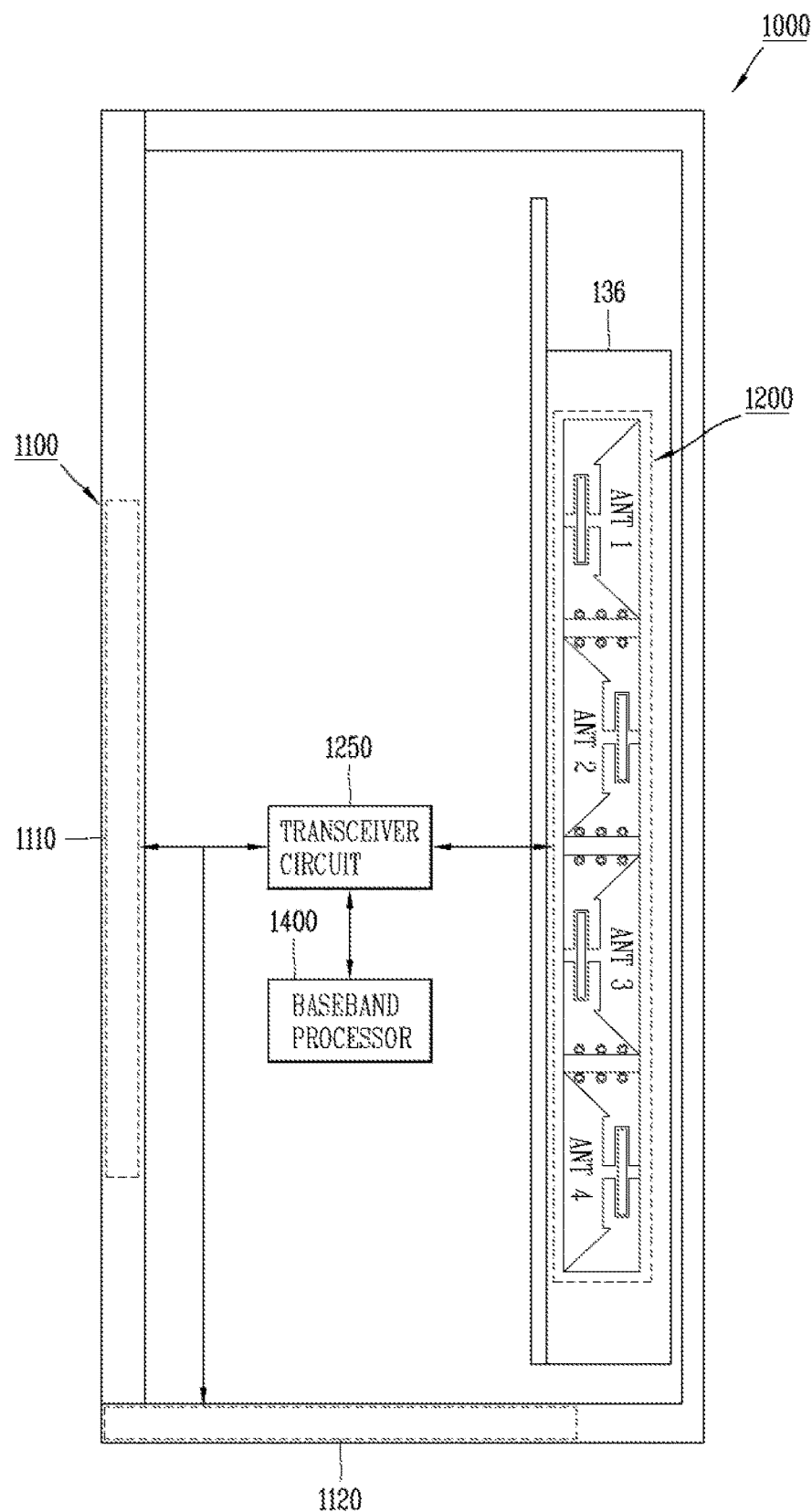
FIG. 15 is a view illustrating a configuration that a baseband processor controls a plurality of antenna modules in accordance with another implementation.

FIG. 14 is a view illustrating a configuration that a baseband processor controls a plurality of antenna modules in accordance with one implementation. FIG. 15 is a view illustrating a configuration that a baseband processor controls a plurality of antenna modules in accordance with another implementation.

Referring to FIG. 14, an antenna module operating in the 5G Sub 6 band among a plurality of antenna modules may have the structure separated by the dielectric as illustrated in FIG. 9A. Also, referring to FIG. 15, the antenna module operating in the 5G Sub 6 band among the plurality of antenna modules may have the vertical symmetric structure as illustrated in FIG. 9B.

In this regard, the low-profile antenna of the various shapes according to the present disclosure may operate in the 5G Sub 6 band. In this case, the operating band of the low-profile antenna of various shapes may not be limited thereto, and may operate in any communication frequency band. The low-profile antenna may operate in the 5G Sub 6 band, and antennas implemented as conductive members disposed on the side surfaces of the electronic device may operate in the LTE band. As such, a control operation for a plurality of antennas operating in a plurality of communication systems may be required.

FIGS. 14 and 15 are diagrams illustrating an electronic device including a plurality of antennas, a transceiver circuit, and a baseband processor according to the present disclosure. Referring to FIGS. 1A to 15, the electronic device 1000 may include a 4G antenna 1100, a 5G antenna 1200, a transceiver circuit 1250, and a baseband processor 1400. Here, the 4G antenna 1100 and the 5G antenna 1200 may be referred to as a first type antenna 1100 and a second type antenna 1200, respectively. Although the 5G antenna 1200 is illustrated as a 1×4 MIMO antenna in FIGS. 14 and 15, the present disclosure may not be limited thereto. The 5G antenna 1200 may be changed to various forms such as a 1×2 MIMO antenna.

The 4G antenna 1100 which is the first type antenna may be disposed on the side surface of the electronic device to operate in a first band as the LTE band. On the other hand, the 5G antenna 1200 which is the second type antenna may be an antenna configured to operate in a second band, which is the 5G Sub 6 band. Here, the position of the 4G antenna 1100 may not be limited to that illustrated in FIGS. 14 and 15, and may alternatively be in one region of the left, right, upper or lower portion of the electronic device.

In the case of the 1×2 MIMO antenna, the 5G antenna 1200 may include the first antenna ANT1 and the second antenna ANT2. Accordingly, the first antenna ANT1 and the second antenna ANT2 may be 5G antennas operating in the second band, which is the 5G Sub 6 band. In the case of the 1×4 MIMO antenna, the 5G antenna 1200 may include the first to fourth antennas ANT1 and ANT4. Accordingly, the first to fourth antennas ANT1 and ANT4 may be 5G antennas operating in the second band, which is the 5G Sub 6 band.

The transceiver circuit 1250 may be connected to the feeding patterns F1 and F2 to transmit signals to the first metal pattern P1, P3 and the second metal pattern P2, P4 through the feeding patterns F1 and F2. Referring to FIGS. 14 and 15, in the case of the 1×4 MIMO antenna, the transceiver circuit 1250 may be connected to the feeding patterns F1 to F4. In this case, the transceiver circuit 1250 may transmit signals to the first metal patterns P1, P3, P5, and P7 and the second metal patterns P2, P4, P6, and P8 through the feeding patterns F1 to F4.

In addition, the baseband processor 1400 may be connected to the transceiver circuit 1250 and control the transceiver circuit 1250 to transmit and receive signals through at least one of the 4G antenna 1100 and the 5G antenna 1200.

Specifically, the transceiver circuit 1250 may transmit and receive a first signal of a first band and transmit and receive a second signal of a second band. The baseband processor 1400 may control the transceiver circuit 1250 to receive the second signal through the 5G antenna when quality of the first signal is lower than or equal to a threshold. In an example, the baseband processor 1400 may perform carrier aggregation (CA) when a broadband transmission is requested and a broadband frequency is allocated. To this end, the baseband processor 1400 may perform CA by using the first signal of the first band received through the 4G antenna 1100 and the second signal of the second band received through the 5G antenna 1200.

Here, the 5G antenna 1200 may be an antenna selected based on reception performance of the first to fourth antennas ANT1 to ANT4. That is, the baseband processor 1400 may compare the reception performances of the first to fourth antennas ANT1 to ANT4 and transmit information on an antenna having the highest reception performance to a base station. Accordingly, two antennas may be selected based on the reception performance, and 5G signals of the second band received through the two antennas may be spatially combined.

On the other hand, the 4G antenna 1100 may be configured to transmit and receive signals of the LTE band. In this regard, the 4G antenna 1100 may be disposed on the side surface of the electronic device. For example, the 4G antenna 1100 may include one or more antennas 1100a and 1100b disposed on the upper, lower, left, or right side of the electronic device.

Accordingly, the baseband processor 1400 corresponding to the modem may perform multiple-input/multi-output (MIMO) or diversity through the 4G antennas 1100a, 1100b. Here, the position and number of the 4G antennas 1100a, 1100b may not be limited thereto, but may vary depending on applications. The number of the 4G antennas 1100a, 1100b may be increased up to 4 to support 4TX or 4RX.

Meanwhile, the first type antennas 1100a, 1100b, which are the 4G antennas, may operate in dual bands to operate in the 5G band as well as the LTE band. In this case, the baseband processor 1400 may perform MIMO using at least one of the first type antennas 1100a and 1100b and at least one of the second type antennas 1200.

Meanwhile, when performing MIMO through the 5G antenna 1200, it may be performed in an optimal manner in consideration of the isolation between the antennas. The baseband processor 1400 may perform MIMO by receiving the first signal through the first antenna ANT1 and a third signal through the third antenna ANT3. That is, the third antenna ANT3 may be selected rather than the second antenna ANT2 disposed right adjacent to the first antenna ANT1, so as to reduce interference between the antennas.

On the other hand, when the quality of the first signal or the third signal is lower than or equal to a threshold, the baseband processor 1400 may select another antenna. In one example, the baseband processor 1400 may perform MIMO by receiving the first signal through the first antenna ANT1 and a fourth signal through the fourth antenna ANT4. Accordingly, the distance between the antennas performing the MIMO can further increase, so that the interference between the antennas can be further reduced.

When the quality of the first signal or the quality of the fourth signal is lower than or equal to the threshold despite such a control operation, the baseband processor 1400 may select another antenna combination. In one example, when the quality of the first signal or the quality of the fourth signal is lower than or equal to the threshold, the baseband processor 1400 may perform MIMO by receiving the signal through the second antenna ANT2 and another signal through another antenna. That is, the baseband processor 1400 may perform the MIMO operation by using the second signal received through the second antenna ANT2 and the fourth signal received through the fourth antenna ANT4.

Hereinafter, a configuration of an electronic device having a plurality of antenna modules according to another aspect will be described. Referring to FIGS. 1 to 15, the plurality of antenna modules may include the first antenna ANT1 and the second antenna ANT2. In addition, the electronic device having the plurality of antenna modules may include the transceiver circuit 1250 corresponding to the RFIC and the baseband processor 1400 corresponding to the modem.

Specifically, the first antenna ANT1 may include the metal patterns 1210 or P1, P2 formed by printing a metal having a predetermined length and width on the front surface of the substrate and configured to radiate the first signal. The first antenna ANT1 may further include the feeding pattern that is disposed with being offset from the center line of the substrate within the region defined as metal patterns are spaced apart from each other, and configured to perform coupling feeding for the first signal to the metal patterns.

The second antenna ANT2 may include the metal patterns 1210 or P3, P4 disposed adjacent to the first antenna ANT1 at the left and right sides on the upper portion of the substrate, and the second feeding pattern 1220-2, F2, and configured to radiate the second signal.

As described above, the electronic device having the plurality of antenna modules may include the transceiver circuit 1250 corresponding to the RFIC and the baseband processor 1400 corresponding to the modem. Here, the transceiver circuit 1250 may be connected to the feeding pattern F1 and the second feeding pattern F2, and radiate at least one of the first signal and the second signal through one of the first antenna ANT1 and the second antenna ANT2. The baseband processor 1400 may be connected to the transceiver circuit 1250, and control the transceiver circuit to vary magnitudes of the first and second signals fed to the first antenna ANT1 and the second antenna ANT2. For example, during 4G/5G switching or MIMO, the baseband processor 1400 may control the transceiver circuit 1250 so that a signal is applied to a specific antenna and not applied to another antenna.

As another example, the baseband processor 1400 may control first and second power amplifiers of the transceiver circuit 1250 to compensate for a difference in reception level between the first signal and the second signal based on channel state information. In this regard, when one of the first signal or the second signal has a lower signal level than the other signal, there may be a problem in that it is difficult to decode information transmitted through the corresponding signal. In order to solve this problem, the baseband processor 1400 may vary an amplification ratio of the first and second power amplifiers of the transceiver circuit 1250 to compensate for the difference in reception level between the first signal and the second signal based on the channel state information. Accordingly, information can be decoded without loss through the first signal and the second signal during rank 2 transmission or reception.

Meanwhile, the first antenna ANT1 and the second antenna ANT2 may include the first radiation portions 1211*a*, 1212*a*, 1211*a*2, 1212*a*2 and the second radiation portions 1211*b*, 1212*b*, 1211*b*2, and 1212*b*2. Here, the first radiation portions 1211*a*, 1212*a*, 1211*a*2, and 1212*a*2 may be formed in the rectangular shape having the predetermined length and width, and may have the inset regions therein. In addition, the second radiation portion 1211*b*, 1212*b*, 1211*b*2, 1212*b*2 may be connected to the first radiation portion and tapered at the predetermined angle to increase the width.

Meanwhile, the 1×4 MIMO antenna may further include the third antenna ANT3 and the fourth antenna ANT4 in addition to the first antenna ANT1 and the second antenna ANT2.

Specifically, the third antenna ANT3 may be disposed adjacent to the second antenna ANT2 on the upper portion of the substrate, and configured to radiate the third signal through the metal patterns P5 and P6 and the third feeding pattern F3. Also, the fourth antenna ANT4 may be disposed adjacent to the third antenna ANT3 on the upper portion of the substrate, and configured to radiate the fourth signal through the metal patterns P7 and P8 and the fourth feeding pattern F4.

Accordingly, at least one of the first to fourth signals may be transmitted or received through the first to fourth antennas ANT1 to ANT4. In this case, the baseband processor 1400 may perform UL MIMO to transmit two or more signals simultaneously in the same band. Also, the baseband processor 1400 may perform DL MIMO to receive two or more signals simultaneously in the same band.

Meanwhile, when performing MIMO through the 5G antenna 1200, it may be performed in an optimal manner in consideration of the isolation between the antennas. The baseband processor 1400 may perform MIMO by receiving the first signal through the first antenna ANT1 and the third signal through the third antenna ANT3. That is, the third antenna ANT3 may be selected rather than the second antenna ANT2 disposed right adjacent to the first antenna ANT1, so as to reduce the interference between the antennas.

On the other hand, when the quality of the first signal or the third signal is lower than or equal to a threshold, the baseband processor 1400 may select another antenna. In one example, the baseband processor 1400 may perform MIMO by receiving the first signal through the first antenna ANT1 and the fourth signal through the fourth antenna ANT4. Accordingly, the distance between the antennas performing the MIMO can further increase, so that the interference between the antennas can be further reduced.

When the quality of the first signal or the quality of the fourth signal is lower than or equal to the threshold despite such a control operation, the baseband processor 1400 may select another antenna combination. In one example, when the quality of the first signal or the quality of the fourth signal is lower than or equal to the threshold, the baseband processor 1400 may perform MIMO by receiving the signal through the second antenna ANT2 and another signal through another antenna. That is, the baseband processor 1400 may perform the MIMO operation by using the second signal received through the second antenna ANT2 and the fourth signal received through the fourth antenna ANT4.

So far, the electronic device having the 5G antenna has been described. Hereinafter, technical effects of an electronic device having a 5G antenna, in particular, an electronic device having an antenna of a low-profile structure that can be disposed inside the electronic device will be described.

The present disclosure can provide an electronic device in which a low-profile antenna with a small size and a low height is disposed even in a full display structure.

The present invention can also provide a low-profile antenna that can be disposed inside an electronic device to be horizontal to a cover of the electronic device, so as to secure high antenna space utilization and arrangement freedom while optimizing wireless performance.

The present disclosure can further provide a 1×n MIMO antenna module capable of securing isolation between low-profile antennas disposed adjacent to each other.

According to the present disclosure, antenna patterns disposed between feeding patterns can serve as antenna radiators, respectively, and also provide a de-coupling effect, thereby improving antenna isolation (S21 and ECC).

In particular, the low-profile antenna can be effectively designed to have a very low height of 0.02λ, or lower, and can easily implement impedance matching.

In particular, the low-profile antenna may have a radiator with both end portions shorted, which can be advantageous in view of arranging plural antennas by virtue of miniaturization of antennas and improvement of isolation between antennas.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

In relation to the aforementioned present disclosure, the design of a low-profile antenna and the control of an antenna and a transceiver circuit by a controller such as a baseband processor can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180, 1250, 1400 of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An electronic device, comprising:
an antenna pattern formed on a first substrate; and
a ground pattern formed on a second substrate disposed under the first substrate;
wherein the antenna pattern comprises:
a first metal pattern having a first region and a second region connected to the first region and having a larger width than the first region;
a second metal pattern spaced apart from the first metal pattern and having a third region and a fourth region connected to the third region and having a larger width than the third region; and
a first feeding pattern disposed between the first metal pattern and the second metal pattern,
wherein the antenna pattern constitutes a first antenna further comprising a plurality of vias configured to connect first and second metal patterns and the ground pattern at an end portion of the first substrate,
wherein the antenna pattern constitutes a second antenna adjacent to the first antenna further comprising a plurality of vias configured to connect the first and second metal patterns and the ground pattern at an end portion of the first substrate,
wherein the ground pattern disposed under the second substrate is connected to a system ground in a partial region through a PCB provided in the electronic device, and
wherein the ground pattern is spaced apart from the system ground in an area other than the partial region to increase bandwidths of the first antenna and the second antenna
wherein the first metal pattern and the second metal pattern are connected to the ground pattern of the second substrate at a central region of the second substrate corresponding to edges of the second region and the fourth region.

2. The electronic device of claim 1, wherein a horizontal magnetic field current is generated in a horizontal plane with the first metal pattern and the second metal pattern in a boundary region between a boundary region of the first feeding pattern and an inset region of the first feeding pattern, and the horizontal magnetic field current causes a height of the substrate on which the antenna pattern are formed to be reduced.

3. The electronic device of claim 1, wherein the metal pattern of the first antenna and the metal pattern of the second antenna are disposed on an upper portion of the first substrate,
wherein the first antenna and the second antenna are arranged in a horizontal symmetric form with respect to a center line of the first substrate and the second substrate is disposed under the first substrate, and
wherein the ground pattern is disposed on a lower portion of the second substrate to provide a reference electric potential for the first antenna and the second antenna.

4. The electronic device of claim 1, wherein each of the first and second antennas comprises:
a first radiation portion formed in a rectangular shape having a predetermined length and width, and having an inset region formed therein; and
a second radiation portion connected to the first radiation portion and formed to be tapered at a predetermined angle to increase a width,
wherein the first radiation portion of the first antenna forms a first region of the first metal pattern and a third region of the second metal pattern, and
wherein the second radiation portion of the first antenna forms a second region of the first metal pattern and a fourth region of the second metal pattern.

5. The electronic device of claim 4, wherein at a point where the first radiation portion and the second radiation portion are connected, a width of the first radiation portion is formed to be wider than a width of the second radiation portion so that a coupling amount of signals from the first feeding pattern to the first radiation portion increases and an electrical length by the first antenna and the second antenna increases.

6. The electronic device of claim 4, wherein each of the first feeding pattern and a second feeding pattern of the second antenna is disposed in the inset region inside the first radiation portion, and
wherein a position at which each of the first feeding pattern and the second feeding pattern is disposed are offset by a predetermined distance from an end portion in a width direction of the first radiation portion so as to improve isolation characteristics of the first antenna and the second antenna.

7. The electronic device of claim 4, wherein the second radiation portion of the first antenna and the second radiation portion of the second antenna are interconnected to reduce a size of an antenna module formed by the first antenna and the second antenna.

8. The electronic device of claim 4, wherein the second antenna is adjacent to the first antenna and is disposed above the first substrate, and
wherein the electronic device further comprises:
a third antenna disposed adjacent to the second antenna above the first substrate and configured to radiate a third signal through a metal pattern and a third feeding pattern; and
a fourth antenna adjacent to the third antenna above the first substrate and configured to radiate a fourth signal through a metal pattern and a fourth feeding pattern.

9. The electronic device of claim 8, wherein the second radiation portion of the first antenna and the second radiation portion of the second antenna are configured to be separated from each other by a dielectric region of the first substrate to reduce interference between the first antenna and the second antenna.

10. The electronic device of claim 8, wherein the first antenna to fourth antenna further comprises a plurality of vias configured to connect the first and second metal patterns to the ground pattern at an end portion the first and second metal patterns of formed on the first substrate, and
wherein the plurality of vias are formed in a metal pattern of an adjacent antenna separated from each other by a dielectric region of the first substrate.

11. The electronic device of claim 8, further comprising:
a 4G antenna disposed on a side surface of the electronic device and configured to operate in a first band as an LTE band, wherein the first antenna and the second antenna are 5G antennas operating in a second band as a 5G Sub 6 band; and
a baseband processor connected to a transceiver circuit and configured to control the transceiver circuit to transmit and receive signals through at least one of the 4G antenna and the 5G antennas.

12. The electronic device of claim 11, wherein the transceiver circuit is configured to transmit and receive long-term evolution (LTE) signals of the first band and transmit and receive 5G signals of the second band, and wherein the baseband processor is configured to,
control the transceiver circuit to receive the 5G signal through the 5G antenna when quality of the LTE signal is lower than or equal to a threshold, and
perform carrier aggregation (CA) by using the LTE signal of the first band received through the first antenna and the 5G signal of the second band received through an antenna having an optimal reception performance among the first to fourth antennas when broadband transmission is requested and a broadband frequency is allocated.

13. The electronic device of claim 11, wherein the baseband processor is configured to,
perform multi-input/multi-output (MIMO) by receiving the first signal received through the first antenna and the fourth signal received through the fourth antenna, and
perform MIMO by receiving the second signal received through the second antenna and the third signal received through the third antenna when quality of the first signal or quality of the fourth signal is lower than or equal to a threshold.

14. The electronic device of claim 8, wherein the ground pattern is connected to the system ground in three or more regions, and
wherein the connected regions are the central region of the second substrate and both end regions of the second substrate.

15. An antenna module, comprising:
an antenna pattern formed on a first substrate; and
a second substrate disposed under the first substrate and a ground pattern formed thereon,
wherein the antenna pattern comprises:
a first metal pattern having a first region and a second region connected to the first region and having a larger width than the first region;
a second metal pattern spaced apart from the first metal pattern and having a third region and a fourth region connected to the third region and having a larger width than the third region; and
a first feeding pattern disposed between the first metal pattern and the second metal pattern,
wherein the antenna pattern constitutes a first antenna further comprising a plurality of vias configured to connect first and second metal patterns and the ground pattern at an end portion of the first substrate,
wherein the antenna pattern constitutes a second antenna adjacent to the first antenna further comprising a plurality of vias configured to connect the first and second metal patterns and the ground pattern at an end portion of the first substrate,
wherein the ground pattern disposed under the second substrate is connected to a system ground in a partial region through a PCB provided in the electronic device
wherein the ground pattern is spaced apart from the system ground in an area other than the partial region to increase bandwidths of the first antenna and the second antenna, and
wherein the first metal pattern and the second metal pattern are connected to the ground pattern of the second substrate at a central region of the second substrate corresponding to edges of the second region and the fourth region.

16. The antenna module of claim 15, wherein the antenna pattern comprises a first antenna and a second antenna adjacent to the first antenna,
wherein each of the first and second antennas comprises:
a first radiation portion formed in a rectangular shape having a predetermined length and width, and having an inset region formed therein; and
a second radiation portion connected to the first radiation portion and formed to be tapered at a predetermined angle to increase a width,
wherein the first radiation portion of the first antenna forms a first region of the first metal pattern and a third region of the second metal pattern, and
wherein the second radiation portion of the first antenna forms a second region of the first metal pattern and a fourth region of the second metal pattern.

17. The antenna module of claim 15, wherein the antenna pattern comprises a first antenna and a second antenna adjacent to the first antenna, and
wherein the electronic device further comprises:
a third antenna disposed adjacent to the second antenna above the first substrate and configured to radiate a third signal through a metal pattern and a third feeding pattern; and
a fourth antenna disposed adjacent to the third antenna above the first substrate and configured to radiate a fourth signal through a metal pattern and a fourth feeding pattern.

* * * * *